US011138667B2

(12) United States Patent
Aber et al.

(10) Patent No.: US 11,138,667 B2
(45) Date of Patent: Oct. 5, 2021

(54) DATA STRUCTURES FOR TRANSFER AND PROCESSING OF FINANCIAL DATA

(71) Applicant: Nvstr Technologies Inc., New York, NY (US)

(72) Inventors: Patrick J. Aber, New York, NY (US); Bernard M. George, New York, NY (US)

(73) Assignee: Nvstr Technologies Inc., New York, NY (US)

( * ) Notice: Subject to any disclaimer, the term of this patent is extended or adjusted under 35 U.S.C. 154(b) by 368 days.

(21) Appl. No.: 15/472,004

(22) Filed: Mar. 28, 2017

(65) Prior Publication Data
US 2017/0287074 A1    Oct. 5, 2017

Related U.S. Application Data

(60) Provisional application No. 62/315,470, filed on Mar. 30, 2016.

(51) Int. Cl.
*G06Q 40/06*    (2012.01)
*G06Q 40/04*    (2012.01)

(52) U.S. Cl.
CPC ............. *G06Q 40/06* (2013.01); *G06Q 40/04* (2013.01)

(58) Field of Classification Search
CPC .............................. G06Q 40/06; G06Q 40/04
See application file for complete search history.

(56) References Cited

U.S. PATENT DOCUMENTS

| 5,930,774 | A  | * | 7/1999  | Chennault | G06Q 40/06 |
|---|---|---|---|---|---|
|  |  |  |  |  | 705/36 R |
| 2002/0111890 | A1 | * | 8/2002  | Sloan | G06Q 40/00 |
|  |  |  |  |  | 705/36 R |
| 2002/0147671 | A1 | * | 10/2002 | Sloan | G06Q 40/00 |
|  |  |  |  |  | 705/36 R |
| 2007/0244769 | A1 | * | 10/2007 | Boesel | G06Q 30/0601 |
|  |  |  |  |  | 705/26.1 |

(Continued)

FOREIGN PATENT DOCUMENTS

WO    WO2012142109 A1    10/2012

OTHER PUBLICATIONS

HeadChatter (Year: 2016).*

(Continued)

*Primary Examiner* — Kito R Robinson
(74) *Attorney, Agent, or Firm* — Fish & Richardson P.C.

(57) ABSTRACT

An example computer-implemented method includes retrieving, by at least one processor, one or more first data structures pertaining to a current state of a financial portfolio of a first user, one or more second data structures pertaining to one or more historical and/or current states of a financial market, one or more third data structures pertaining to one or more predictions regarding one or more financial assets of the financial market, and one or more fourth data structures pertaining to the first user's preferences with respect to the financial portfolio. The method also includes determining, by the at least one processor, one or more transactions to be conducted on the financial market based on the first, second, third, and fourth data structures. The method also includes executing, by the at least one processor, the one or more transactions.

27 Claims, 14 Drawing Sheets

(56) References Cited

U.S. PATENT DOCUMENTS

| | | | | |
|---|---|---|---|---|
| 2007/0271196 A1* | 11/2007 | Blitzer | ............. | G06Q 40/00 705/36 R |
| 2008/0154794 A1* | 6/2008 | Johansson | ............. | G06Q 40/00 705/36 R |
| 2009/0076939 A1* | 3/2009 | Berg | ............. | G06Q 40/04 705/37 |
| 2009/0119195 A1* | 5/2009 | Kurczek | ............. | G06Q 40/00 705/35 |
| 2010/0138357 A1* | 6/2010 | Mufti-Bey | ............. | G06Q 40/06 705/36 R |
| 2011/0137913 A1* | 6/2011 | Bhatti | ............. | G06Q 10/10 707/741 |
| 2011/0145038 A1* | 6/2011 | Ghosh | ............. | G06Q 30/02 705/7.32 |
| 2012/0101933 A1* | 4/2012 | Hanson | ............. | G06Q 30/0202 705/37 |
| 2012/0158613 A1* | 6/2012 | Bollen | ............. | G06Q 30/02 705/36 R |
| 2012/0226645 A1* | 9/2012 | O'Rourke | ............. | G06Q 40/06 706/46 |
| 2013/0085965 A1* | 4/2013 | Dai | ............. | G06Q 40/06 705/36 R |
| 2013/0132861 A1* | 5/2013 | Kienzle | ............. | G06Q 10/10 715/753 |
| 2013/0191265 A1* | 7/2013 | Nanwani | ............. | G06Q 40/04 705/37 |
| 2013/0346274 A1* | 12/2013 | Ferdinand | ............. | G06Q 40/04 705/37 |
| 2014/0012777 A1* | 1/2014 | Freeman | ............. | G06Q 40/06 705/36 R |
| 2014/0164210 A1* | 6/2014 | Geber | ............. | G06Q 40/04 705/37 |
| 2014/0297495 A1* | 10/2014 | Dalal | ............. | G06Q 40/04 705/37 |
| 2014/0317021 A1* | 10/2014 | Weber | ............. | G06Q 40/06 705/36 R |
| 2014/0365351 A1* | 12/2014 | Carlberg | ............. | G06Q 40/04 705/37 |
| 2015/0317733 A1* | 11/2015 | Chibly | ............. | G06Q 40/04 705/37 |
| 2015/0348188 A1* | 12/2015 | Chen | ............. | G06Q 40/04 705/37 |
| 2016/0005128 A1* | 1/2016 | White | ............. | G06Q 40/06 705/36 R |
| 2016/0078539 A1* | 3/2016 | Ignatovich | ............. | G06Q 40/04 705/37 |
| 2016/0092989 A1* | 3/2016 | Marsh | ............. | G06Q 40/06 705/37 |
| 2016/0225086 A1* | 8/2016 | Seitz | ............. | G06Q 40/06 |
| 2016/0239918 A1* | 8/2016 | Lambur | ............. | G06Q 40/06 |
| 2016/0292786 A1* | 10/2016 | Khizhnyak | ............. | G06Q 40/04 |
| 2017/0221146 A1* | 8/2017 | Ramachandran | ... | G06F 16/9535 |
| 2017/0255997 A1* | 9/2017 | Watson | ............. | G06Q 40/06 |

OTHER PUBLICATIONS

KDnuggets Post—HedgeChatter (Year: 2013).*

Nassirtoussi, A. K., Aghabozorgi, S., Teh, Y. W., & Ngo, D. C. L. (2014). Text mining for market prediction: A systematic review. Expert Systems with Applications, 41(16), 7653-70. doi:http://dx.doi.org/10.1016/j.eswa.2014.06.009 on Apr. 30, 2021 (Year: 2014).*

Andersson, M., Hedesstrom, T. M., & Garling, T. (2009). Social influence on predictions of simulated stock prices. Journal of Behavioral Decision Making, 22(3), 271-279. doi:http://dx.doi.org/10.1002/bdm.625 on Apr. 30, 2021 (Year: 2009).*

International Search Report and Written Opinion for International Application No. PCT/US2017/025058, dated May 19, 2017, 14 pages.

* cited by examiner

FIG. 4C

NVSTR
INVEST BETTER TOGETHER

PORTFOLIO | PEOPLE | IDEAS

MY IDEAS | IDEA LAB

504 My Ideas NEW search quote 🔍

OPTIMIZE TO LOWER RISK BY 25%

My Ideas

+ CREATE IDEA

| | | Current Price | Target Price | Target Return | Horizon | Thesis | Source | Active | Edit |
|---|---|---|---|---|---|---|---|---|---|
| BUY | AAPL Apple Inc. | $126.06 | $130 Moderately Sure | 1.64% | Long Term | Management | Me | 🔘 | ✎ |
| BUY | FLEX Flextronics INTL LTD | $135.00 | $140 Very Sure | 1.19% | Short Term | Value | Me | 🔘 | ✎ |
| BUY | FSL Freescale Semiconductor LTD | $27.00 | $14 Very Sure | -2.9% | Long Term | Event | Me | 🔘 | ✎ |
| BUY | HIG Hartford Financial SVCS GRP | $84.00 | $100 Not Sure | 0.5% | Long Term | Value | Warren B. | 🔘 | ✎ |
| SELL | LNC Lincoln National Corp | $11.00 | $14 Very Unsure | -4.73% | Short Term | Management | Laura P. | 🔘 | ✎ |

*nvstr* ABOUT FAQ CONTACT US

Lorem ipsun h;ao ray ejkusd piuo huuyvy popo aoiwdu hiweruf tg hirugyyeig ghwerift oiwefy\ qoiewoie wyet yow o wfuwi wf8w /weuo uq7tdhwy wegeiryoerpo oergoygwpqgtyq qwgn' 9w4juwefvwyid2wi29jv0 jhs weir e5ye ny ik w y57u67i6 werwedf ge45yuu fyj 2015 all rights reserved 430
432
434
436
49 of 65

FIG. 4D

NVSTR nvstr INVEST BETTER TOGETHER

POSITIONS  FUNDING  PORTFOLIO  HISTORY  PEOPLE  TRADE  IDEAS search quote 🔍   301 Notifications Total Value: $210,506
Gains to Date: +$5,912.26
Day Change: +$464.26

OPTIMIZE TO LOWER RISK BY 25%

Explore New Ideas
Discover new ideas in the idea lab.
Get inspired by your connections and Thought Leaders.

Idea lab

Active Positions

| | Current Price | Change Today | Shares | Optimized Shares | Price Target | Allocations | Total Value | Optimized Value |
|---|---|---|---|---|---|---|---|---|
| ALL | $54.70 | $0.39 / 0.72% | 546 | 634 | $60.00 | 14% | $29,881 | $34,662 |
| ARM | $41.21 | -$0.48 / -1.17% | 426 | 481 | $46.00 | 8% | $17,599 | $19,817 |
| BRCM | $50.32 | -$0.44 / -0.87% | 273 | 0 | $45.00 | 7% | $13,728 | --- |
| G | $62.32 | -$1.00 / -1.92% | 437 | 382 | $55.00 | 11% | $22,865 | $20,007 |
| CSIQ | $16.85 | +$0.26 / +1.53% | 546 | 1093 | $30.00 | 4% | $9,205 | $18,410 |
| FLEX | $9.90 | +$0.12 / +1.20% | 1639 | 1639 | $10.00 | 8% | $15,356 | $53,578 |
| FSL | $35.28 | +$0.45 / +1.28% | 1365 | 1519 | $40.00 | 23% | $48,182 | $32,073 |
| HIG | $46.23 | +$1.70 / +3.67% | 594 | 694 | $48.00 | 15% | $32,073 | $32,045 |
| LNC | $46.48 | +$0.15 / +0.32% | 426 | 651 | $60.00 | 10% | $20,657 | $5,051 | nvstr  ABOUT  FAQ  CONTACT US

Lorem ipsun h;ao ray ejkusd piuo huuyvy popo aoiwdu hiweruf tg hirugyyeig ghwerift oiwefy\ qoiewoie wyet yow O wrfuwi wt8w /weuo uq7tdtwy weqeirgyoerpo oergoygwpqgtyq qwgri qwuiwefywytd2wi29iy0 jhs weir e5ye ny ik w y57u67i6 werwedf ge45yuu fyj
2015 all rights reserved

NVSTR
nvstr
INVEST BETTER TOGETHER

PORTFOLIO  PEOPLE  IDEAS

OPTIMIZE TO LOWER RISK BY 25%    search quote    705 Notifications

Notifications

- John D. optimized his portfolio and gained 23% in projected growth. — 15 mins ago
- Peter V. optimized his portfolio and lowered risk by 10%. — 1 hour ago
- Samantha G. 's portfolio value increased by 14%. — 1 hour ago
- Andrea M. moved an idea. — 2 hours ago
- Hayden C. accepted your connection request. — 3 hours ago
- Clarence E. joined NVSTR via your invitation! — Yesterday
- Jordon F. requested to connect with you. — Yesterday
- Peter V's stock has increased by 6% — 2 days ago
- Kayla B. added an idea by you.

nvstr   ABOUT   FAQ   CONTACT US
Lorem ipsun h;ao ray ejkusd piuo huuyvy popo aoiwdu hiweruf tg hirugyyeig ghweriff oiwefy\
qoiewoie wyet yow o wfuwi w8w /lweuo uq7tdtwy weqeirgyoerpo oergoygwpqgtyq qwgri
qwuiwefywyfd2wi29iy0 jhs weir e5ye ny ik w y57u67i6 werwedf ge45yuu fyj
2015 all rights reserved

Bernard George

BUY
APPL $138.68
Apple Inc -$0.32 (-0.23%)
Technology Hardware,
Storage and Peripherals $139.79
$120
$100
$90.34
04/06/2016  07/31/2016  11/24/2016

ASK WHY — 476
3 interested

ADD IDEA
0 adds 47 views

| | |
|---|---|
| Price Target | $125.00 (-7.6%) |
| Conviction | Very Sure |
| Horizon | Long Term |
| Expected Dividend | Expected Dividend |

Ask Bernard if they agree with the following through on APPL... ← 478
*e.g.; Upcoming product will add value (100 characters max)*
A thought is a single concept that your connections can agree or disagree with. You can add any number of thoughts separately.

Pro | Con
ADD

Thesis | Value

Bernard's Thoughts | Valuation metrics suggest stock is mispriced ← 474

Do you agree?

| Thought | 👍 | 👎 |
|---|---|---|
| Tim Cook may not have the product vision/sense/focus that Steve Jobs had. | +6 | -0 |
| Inexpensive P/E | +6 | -0 |
| New MacBook Pro with the 'touch bar is very controversial" | +5 | -0 |
| Love their tech | +4 | -0 |
| The new MacBook Pro is an excellent machine, but the touch bar isn't a meaningful improvement | +4 | -1 |
| long term value play | +3 | -0 |
| Pace of innovation/new features on iPhone 7 vs earlier models seems to have slowed a bit | +3 | -0 |
| iPhone pre-orders may be representative of small early adopter segment rather than general public | +4 | -1 |

As you add more investment ideas your projected returns can increase.

Based on the ideas you've entered so far, your projected returns are 4%, with a 75% chance of seeing returns between –1% and 9%

*Type company name of symbol*

IMPORTANT: The projections or other information generated by the Optimizer regarding the likelihood of various investment outcomes are hypothetical in nature, do not reflect actual investment results and are not guarantees of future results. More details can be found here.

What are Projected Returns?

MSFT    ABC

Why ABC?
e.g., Upcoming product will add value (100 characters max)

Pro | Con
ADD

492

If you're out of ideas, we'll fill in the rest with some diversified ETFs.

DATA STRUCTURES FOR TRANSFER AND PROCESSING OF FINANCIAL DATA

CROSS-REFERENCE TO RELATED APPLICATIONS

This application claims the benefit under 35 U.S.C. § 119(e) of U.S. Patent Application No. 62/315,470, entitled "Data Structures For Transfer And Processing Of Financial Data," filed Mar. 30, 2016, which is incorporated herein by reference in its entirety.

BACKGROUND

Computerized financial transaction systems allow users to electronically create and maintain financial portfolios. For example, a financial transaction system can allow a user to purchase one or more assets from a financial market (e.g., a stock, a bond, a commodity, or other asset), hold the asset for a period of time, and sell the asset. In some examples, computerized financial transaction systems transfer data (e.g., information regarding a financial market and its assets) to/from one another over a communications network, such that the information is shared.

SUMMARY

Implementations of the present disclosure are directed to data structures for transfer and processing of financial data.

In general, in an aspect, a computer-implemented method includes retrieving, by at least one processor, one or more first data structures pertaining to a current state of a financial portfolio of a first user, one or more second data structures pertaining to one or more historical and/or current states of a financial market, one or more third data structures pertaining to one or more predictions regarding one or more financial assets of the financial market, and one or more fourth data structures pertaining to the first user's preferences with respect to the financial portfolio. The method also includes determining, by the at least one processor, one or more transactions to be conducted on the financial market based on the one or more first data structures, the one or more second data structures, the one or more third data structures, and the one or more fourth data structures. The method also includes executing, by the at least one processor, the one or more transactions.

Implementations of this aspect may include one or more of the following features.

In some implementations, the method can further include retrieving the one or more predictions from one or more second users different than the first user. At least one prediction can include an identity of a particular second user, an indication of a particular financial asset of the financial market, and an indication of a predicted future price or return of that financial asset. The at least one prediction can further include an indication of the particular second user's confidence regarding the at least one prediction.

In some implementations, at least one of the one or more third data structures can include a data field containing an identity of the particular second user, a data field containing an indication of the particular financial asset of the financial market, and a data field containing an indication of a predicted future price or return of that financial asset.

In some implementations, the first user's preferences can correspond to at least one of: a risk tolerance of the first user with respect to the financial portfolio, a leverage threshold with respect to the financial portfolio, a volatility tolerance of the first user with respect to the financial portfolio, a cash reserve threshold with respect to the financial portfolio, and one or more asset allocation criteria with respect to the financial portfolio.

In some implementations, determining the one or more transactions to be conducted on the financial market can include determining, by the one or more processors, a target state of the financial portfolio based on the one or more first data structures, the one or more second data structures, the one or more third data structures, and the one or more fourth data structures. Determining the one or more transactions to be conducted on the financial market can also include determining, by the one or more processors, a difference between the target state of the financial portfolio and the current state of the financial portfolio, and determining, by the one or more processors, the one or more transactions to be conducted on the financial market to align the current state of the financial portfolio to the target state of the financial portfolio.

In some implementations, the one or more transactions can be executed in response to receiving an indication to execute the one or more transactions from the first user. The one or more transactions can be executed substantially simultaneously.

In some implementations, the one or more transactions can be executed automatically.

In some implementations, the method can further include retrieving the one or more predictions from the first user, generating one or more fifth data structures based on the one or more predictions from the first user, and transmitting the one or more fifth data structures to one or more second users.

In some implementations, the method can further include generating, by the at least one processor, a notification based on at least one of the one or more first data structures, the one or more second data structures, the one or more third data structures, the one or more fourth data structures, and the one or more fifth data structures. The method can also include displaying the notification to the first user. In some implementations, at least one of the third data structures can be retrieved from a second user, and the notification can be generated based on the at least one third data structure retrieved from the second user.

In some implementations, the method can further include retrieving, by the at least one processor, one or more sixth data structures pertaining to a financial portfolio of a second user, generating, by the at least one processor, a notification based on the one or more sixth data structures, and displaying the notification to the first user.

In some implementations, the method can further include retrieving, by the at least one processor, one or more seventh data structures pertaining to an association between two or more users of a social media platform, generating, by the at least one processor, a second notification based on the one or more seventh data structures, and displaying the second notification to the first user.

In some implementations, the method can further include generating, by the at least one processor, a plurality of notifications based on at least one of the one or more first data structures, the one or more second data structures, the one or more third data structures, the one or more fourth data structures, and the one or more fifth data structures. The method can also include displaying the notifications to the first user. At least some of the notifications can be displayed concurrently in a feed. In some implementations, at least one of the third data structures can be retrieved from a second user, and at least one of the notifications can be generated based on the at least one third data structure retrieved from the second user.

In some implementations, the method can further include retrieving, by the at least one processor, one or more sixth data structures pertaining to a financial portfolio of a second user, generating, by the at least one processor, a plurality of notifications based on the one or more sixth data structures, and displaying the notifications to the first user.

In some implementations, the method can further include retrieving, by the at least one processor, one or more seventh data structures pertaining to an association between two or more users of a social media platform, generating, by the at least one processor, a second plurality of notifications based on the one or more seventh data structures, and displaying the second plurality of notifications to the first user.

In some implementations, the method can further include retrieving, by the at least one processor, one or more eighth data structures. The one or more eighth data structures can include one or more statements received from the first user regarding a particular financial asset or a particular prediction regarding a financial asset. The method can also include presenting, by the at least one processor, the one or more statements to one or more second users, receiving, by the at least one processor, one or more votes regarding the one or more statements from the one or more second users, and presenting, by the at least one processor, the one or more statements and indications of the one or more votes to the first user and the one or more second users.

In some implementations, presenting the one or more statements and the indications of the one or more votes can include presenting the one or more statements and the indications of the one or more votes in a list. The list can be sorted based on the one or more votes.

In some implementations, presenting the one or more statements and the indications of the one or more votes further can include filtering the list based on the one or more votes.

In some implementations, executing the one or more transactions can include executing the one or more transactions in a simulated environment.

Other implementations of this aspect include corresponding systems, apparatus, and computer programs, configured to perform the actions of the methods, encoded on computer storage devices.

Implementations of the present disclosure provide one or more advantages. For example, the use of data structures in accordance with the present disclosure facilitates efficient transfer of data across a computer network. As an example, instead of transferring unstructured data regarding a financial market (e.g., an unstructured narrative describing various aspects of the financial market), data can be formatted according to a pre-defined data structure (e.g., a data item, array, record, or other structure having a particular pre-defined arrangement of fields or entries for each aspect of the financial market). This enables computer systems to transfer and receive data in a consistent manner, thereby increasing the accuracy and/or efficiency of data transmission. Further, as data is stored according to a pre-defined structure, the need to process the data to extract relevant information (e.g., parsing and interpreting that data using natural language processing techniques) is reduced. Thus, data can be processed more efficiently by each of the computer systems, with a reduced consumption of computing resources. Further, the use of data structures in accordance with the present disclosure enables the computer systems to transfer data without extraneous information, thereby increasing the speed of data transfer and storage efficiency of the computer systems.

Further, the implementations described herein can facilitate users in sharing predictions regarding a financial market, and maintaining an optimized financial portfolio based on these predictions. This is beneficial, for example, as it allows users to quickly and easily disseminate knowledge regarding a financial market, browse knowledge shared by others, and execute transactions based on the collective knowledge of those users. Thus, users can execute transactions more confidently, and in a more educated manner.

The details of one or more implementations are set forth in the accompanying drawings and the description below. Other features and advantages will be apparent from the description and drawings, and from the claims.

DESCRIPTION OF DRAWINGS

FIGS. 4A-4J depict example interfaces in accordance with implementations of the present disclosure.

DETAILED DESCRIPTION

Figure 1:
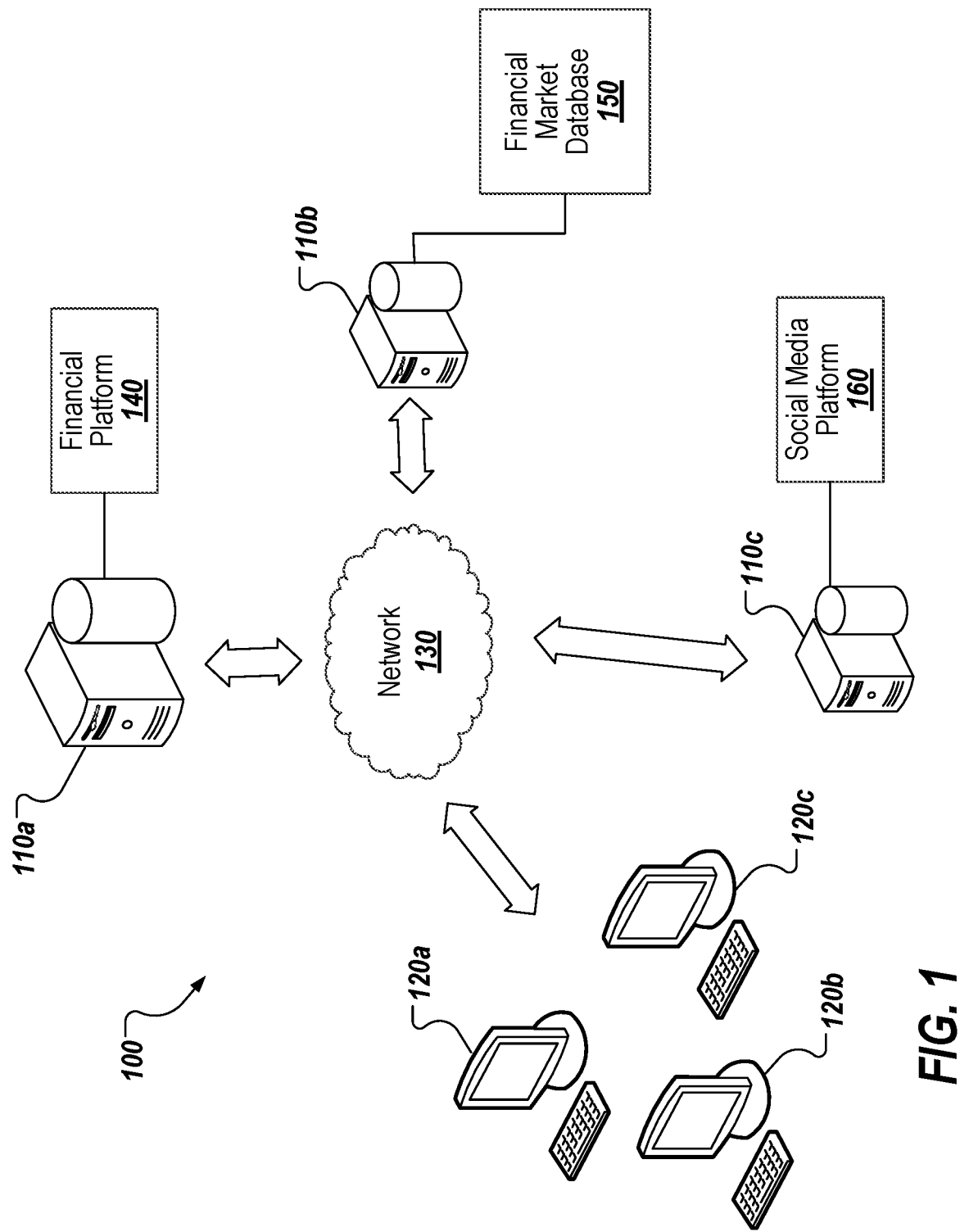
FIG. 1 depicts an example architecture that can be used to execute implementations of the present disclosure.

Implementations of the present disclosure are generally directed to data structures for facilitating the efficient transfer of data across a computer network (e.g., a LAN or the Internet), and the efficient processing of that data by a computerized financial transaction system.

In some implementations, one or more data structures can be used to efficiently transfer information regarding past, present, and predicted future states of a financial market between one or more computer systems. Data structures corresponding to the past states of the financial market can include, for example, information regarding historical performance(s) of one or more assets traded on the financial market (e.g., stocks, bonds, commodities, and other assets). Data structures corresponding to the present state of the financial market can include, for example, the current performance of one or more assets traded on the financial market. Data structures corresponding to the predicted future states of the financial market can include, for example, information regarding a predicted or estimated performance of one or more assets at some point in time in the future.

In some implementations, information regarding the past, present, and predicted future states of the financial market can be used to generate or output transactions for one or more users of a computerized financial trading system. These transactions can be modelled transactions, simulated transactions, transactions that are automatically executed on behalf of the users, and/or other transactions that optimize, improve, or otherwise modify the users' financial portfolios. For example, a computer system can receive information regarding a user's financial portfolio (e.g., information regarding the assets held by the user and the allocation of value among those assets), and information regarding a user's portfolio preferences (e.g., the user's trading goals, risk tolerance, asset allocation goals, availability of funds, and so forth). Based on this information—and based on the past, present, and predicted future states of the financial market—the computer system can output one or more financial transactions that optimize, improve, or otherwise modify the user's portfolio. As an example, the computer system can output one or more transactions (e.g., a purchase or sale of assets) that improve the predicted financial return of the portfolio. As another example, the computer system can output one or more transactions that increase or decrease the financial risk associated with the portfolio, such that the risk aligns with the user's risk tolerance (or otherwise moves closer to the user's risk tolerance). As another example, the computer system can output one or more transactions that reallocate the assets of the portfolio, such that the asset allocation of the portfolio aligns with the user's preferences (or otherwise moves closer to the user's asset allocation preferences).

In some examples, the transactions outputted by the computerized financial trading system can be executed on a financial market, either automatically or in response to a user command. This can be beneficial, for example, as it enables a user to quickly and efficiently modify their financial portfolio.

In some examples, the transactions outputted by the computerized financial trading system are not executed in a real-world financial market, and are instead simulated over a period of time (e.g., as if they actually had been executed in a real-world financial market). This can be beneficial, for example, as it enables users to evaluate the performance of the computerized financial trading system over a period of time without conducting actual transactions in a real-world financial market. This also can be beneficial, for example, as it enables users to view simulated transactions in a low-risk environment. This can also be beneficial, for example, as it enables users to become familiar with the computerized financial trading system prior to funding an account and conducting real-world financial market transactions with their own money.

In some examples, one or more users can share predictions regarding the future states of the financial market. For example, users can utilize their client devices (e.g., personal computers, smartphones, tablet computers, or other client devices) to input information regarding a particular asset of a financial market and information regarding a predicted performance of that asset in the future. This information can be formatted into data structures, and efficiently transferred from the client devices to a computer system (e.g., one or more server computers). The computer system can aggregate the users' predictions, and share one or more of these predictions to each of the users. Thus, a user can share their predictions regarding the financial market, receive predictions from one or more other users regarding the financial market, and discover predictions or other investment ideas that might otherwise be unavailable to the user. In some examples, the computer system can automatically display one or more predictions to each of the users. In some examples, each user can manually specify other users from whom to receive predictions.

At least partially based on shared predictions, the computer system can output one or more financial transactions that optimize, improve, or otherwise modify the user's portfolio. As an example, the computer system can output one or more transactions (e.g., a purchase or sale of assets) to a user according to a particular prediction provided by the user. As another example, the computer system can output one or more transactions (e.g., a purchase or sale of assets) to a user according to a particular prediction provided by another user. As above, these transactions can be provided in accordance with the user's portfolio preferences, such that the transactions do not deviate beyond the user's preferences for managing the portfolio.

Implementations described herein can provide one or more advantages. For example, the use of data structures in accordance with the present disclosure facilitates efficient transfer of data across a computer network. As an example, instead of transferring unstructured data regarding a financial market (e.g., an unstructured narrative describing various aspects of the financial market), data can be formatted according to a pre-defined structure (e.g., a data item, array, record, or other structure having a particular pre-defined arrangement of fields or entries for each aspect of the financial market). This enables computer systems to transfer and receive data in a consistent manner, thereby increasing the accuracy and/or efficiency of data transmission. Further, as data is stored according to a pre-defined structure, the need to process the data to extract relevant information (e.g., parsing and interpreting that data using natural language processing techniques) is reduced. Thus, data can be processed more efficiently by each of the computer systems, with a reduced consumption of computing resources. Further, the use of data structures in accordance with the present disclosure enables the computer systems to transfer data without extraneous information, thereby increasing the speed of data transfer and storage efficiency of the computer systems.

FIG. 1 depicts an example architecture 100 that can be used to execute implementations of the present disclosure. In the depicted example, the architecture 100 includes computing systems 110a-c (e.g., server system), client computing systems 120a-c, and network 130. Although three computing systems 110a-c are depicted, it is appreciated that implementations of the present disclosure can include any number of computing systems (e.g., one, two, three, or more). Similarly, although three client computing systems 120a-c are depicted, it is appreciated that implementations of the present disclosure can include any number of client computing systems (e.g., one, two, three, or more).

The computing system 110a provides a financial platform 140. In some examples, the financial platform 140 is provided as one or more computer-executable programs executed by the computing system 110a. In general, the financial platform 140 allows users to manage their financial portfolios. For example, users can communicate with the financial platform 140 using the client computing system 120a-c to access their financial portfolios (e.g., a portfolio of assets traded on a financial market), obtain information regarding their portfolios, input preferences regarding their financial portfolios, and execute trades or transactions with respect to their financial portfolios. The users can also communicate with the financial platform 140 to input predictions regarding a financial market (e.g., predictions regarding the future performance of various assets) and share those predictions with other users. The users can also communicate with the financial platform 140 to view trades generated by the financial platform 140 and its users, and if desired, execute those trades with respect to their financial portfolios.

The computing system 110b provides a financial market database 150. In some examples, the financial market database 150 is provided as one or more computer-executable programs executed by the computing system 110b. In general, the financial market database 150 includes historical and/or current information regarding a financial market. As examples, the financial market database 150 can include historical and/or current information regarding assets available for trade on a financial market, historical transactions that were conducted with respect to those assets, and/or information regarding current bids and offers with respect to those assets. In some cases, the financial platform 140 can retrieve this information from the financial market database 150 using the network 130.

The computing system 110c provides a social media platform 160. In some examples, the social media platform 160 is provided as one or more computer-executable programs executed by the computing system 110c. In general, the social media platform 160 provides a computerized social environment between one or more users. For example, users of the social media platform 160 can create a profile or account that includes personal information or other information that they wish to share with others. Users of the social media platform 160 can also associate themselves with other users (e.g., by adding other users as "friends," or by "connecting" with or "following" other users), such that they form personal social networks. Users within each of these social networks can share information with one another. In some cases, the financial platform 140 can retrieve information regarding a user (e.g., a user's personal information, social connections, and so forth) from the social media platform 160 using the network 130.

In some cases, the social media platform 160 can utilize information collected from a third-party social network. For instance, the social media platform 160 can collect information regarding users' associations with one another on a third-party social network (e.g., "friends," "connections," "followers," and/or people that the users are "following" on a third-party social network). Based on this information, the social media platform 160 can associate those users together on the financial platform 140. Thus, users' connections and associations on the social media platform 160 can be made similar (or identical) to their connections and associations on the third-party social network. This can be beneficial, for example, as it enables users to quickly and efficiently find and associate themselves with other users of the financial platform 140. Examples of third-party social media platforms include Facebook, Twitter, Instagram, LinkedIn, and Google+.

Although the social media platform 160 is depicted as a separate component in FIG. 1, this is merely an illustrative example. In some implementations, the social media platform 160 can be implemented using other components (e.g., on the computing system 110a) and/or as a part of other platforms (e.g., as a part of the financial platform 140). Further, in some implementations, the social media platform 160 can be implemented on a third-party social network directly (e.g., through the use of application program interfaces (APIs) provided by the third-party social network).

In some examples, each of the computing systems 110a-c includes at least one respective server device. In the example of FIG. 1, the computing systems 110a-c are intended to represent various forms of servers including, but not limited to, a web server, an application server, a proxy server, a network server, a database server, and/or a server pool.

In some examples, the computing systems 110a-c and the client computing systems 120a-c can be any appropriate electronic device that is used by a user to view, process, transmit, and receive data. Examples of computing systems include computers (such as desktop computers, notebook computers, server systems, etc.), mobile computing devices (such as cellular phones, smartphones, tablets, personal digital assistants, smart watches, notebook computers with networking capability), and other computing devices capable of transmitting and receiving data from network 130. The computing systems 110a-c and the client computing system 120a-c include devices that operate using one or more operating systems (e.g., Microsoft Windows, Apple OS X, Linux, Unix, Android, iOS, etc.) and/or architectures (e.g., Intel Core, x86, PowerPC, ARM, etc.) In some implementations, one or more computing systems 110a-c and the client computing system 120a-c need not be located locally with respect to the rest of the architecture 100. For example, one or more of the computing systems 110a-c and the client computing system 120a-c can be located in one or more remote physical locations.

In the depicted example, the computing systems 110a-c and the client computing system 120a-c are each illustrated as a single component, but one or both can be implemented on one or more computing devices. One or more of computing systems 110a-c and the client computing system 120a-c can be, for example, a single computing device that is connected to the network 130, and one or more of the modules 140, 150, and 160 can be maintained and operated on the single computing device. In some implementations, one or more of the computing systems 110a-c and the client computing systems 120a-c can include multiple computing devices that are connected to the network 130, and one or more of the modules 140, 150, and 160 can be maintained and operated on some or all of the computing devices. For example, one or more of the computing systems 110a-c and the client computing system 120a-c can include multiple computing devices, and one or more of the modules 140, 150, and 160 can be distributed on one or more of the multiple computing devices.

In some examples, the network 130 can be any communications network through which data can be transferred and shared. For example, the network 130 can be a local area network (LAN) or a wide-area network (WAN), such as the Internet. The network 130 can be implemented using various networking interfaces, for instance wireless networking interfaces (such as Wi-Fi, Bluetooth, or infrared) or wired networking interfaces (such as Ethernet or serial connections). The network 130 can include combinations of more than one network, and can be implemented using one or more networking interfaces.

In accordance with implementations of the present disclosure, the financial platform 140 allows users to manage their financial portfolios. As described herein, users can communicate with the financial platform 140 using the client computing system 120a-c to access their financial portfolios, obtain information regarding their portfolios, input preferences regarding their financial portfolios, and execute trades or transactions with respect to their financial portfolios. The users can also communicate with the financial platform 140 to input predictions regarding a financial market and share those predictions with other users. The users can also communicate with the financial platform 140 to view trades generated by the financial platform 140, and if desired, execute those trades with respect to their financial portfolios.

Figure 2:
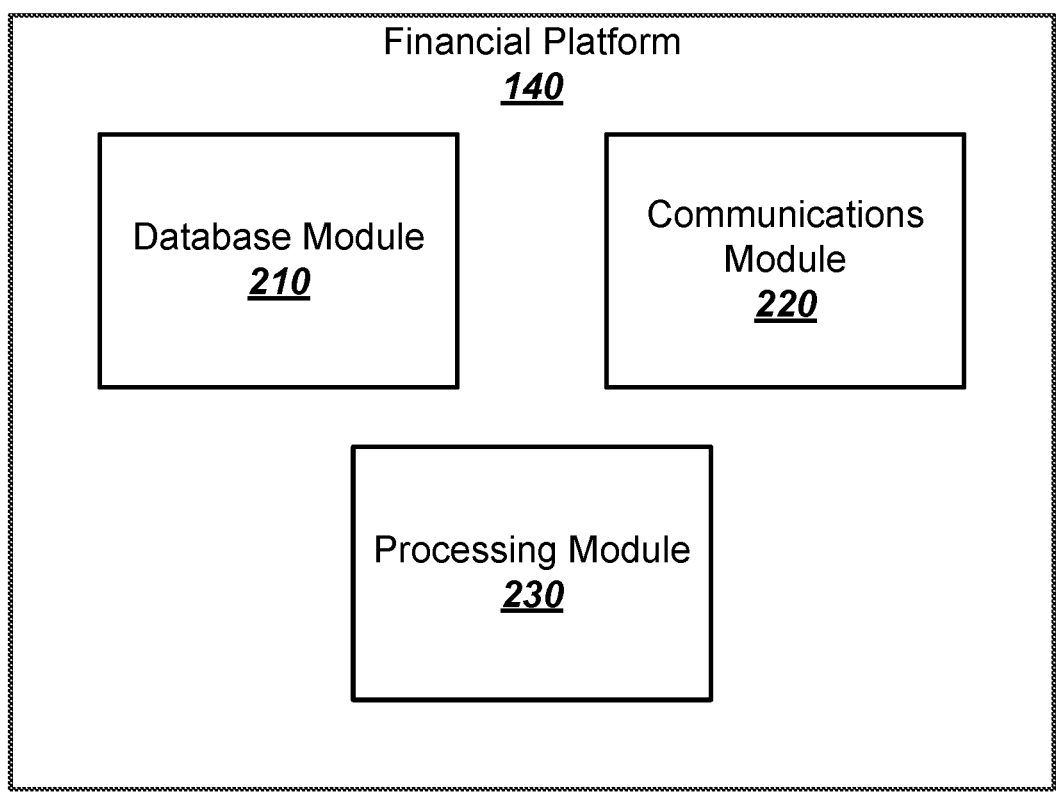
FIG. 2 depicts an example implementation of a financial platform.

FIG. 2 depicts an example of the financial platform 140. In the depicted example, the financial platform 140 includes a database module 210, a communications module 220, and a processing module 230.

In some implementations, the database module 210 maintains information related to one or more users of the financial platform 140. As an example, the database module 210 can store information regarding a user's credentials (e.g., username and password), contact information (e.g., e-mail address, physical address, phone number, social media connections, and so forth), demographic information (e.g., age, gender, geographical region, and so forth), portfolio information (e.g., assets held in the portfolio, allocation of value between those assets, and so forth), preferences (e.g., system preferences and portfolio preferences), location (e.g., geographical coordinates, such as those determined using a global positioning system (GPS), Wi-Fi triangulation system, or other geo-positioning system), relationship information (e.g., indications of a user's association with other users, such as social media connections), and other user information (e.g., collections of other content inputted by or pertaining to a user).

The database module 210 can store data using one or more data structures. For example, the database module 210 can store data in accordance with one or more pre-defined structures (e.g., a data item, array, record, or other structure having a particular pre-defined arrangement of fields or entries for each aspect of the financial market). This allows the database module 210 to store data in a consistent and uniform manner. Example data structures include SQL data structures, XML data structures, Postgres data structures, and spreadsheets. Such structures can include, for example, sequences or arrangements of data items such as integers, long integers, floating-point numbers, double-precision numbers, Booleans, characters, strings, timestamps, and so forth. Data structures can be linked, not linked, nested, combined, encrypted, compressed, or otherwise manipulated or arranged for the purposes of storing, accessing, modifying, and deleting information in database module 210.

Although different examples of information are described above, these are merely illustrative. In practice, database module 210 can store any appropriate information related to the users of financial platform 140 or any other information pertaining to financial platform 140.

The communications module 220 allows for the transmission of data to and from the financial platform 140. For example, communications module 220 can be communicatively connected to network 130, such that it can transmit data to the client computing systems 120a-c and/or the computing systems 110b-c and receive data from the client computing systems 120a-c and/or the computing systems 110b-c. As an example, information inputted by users on client devices 120a-c can be transmitted to the financial platform 140 through communications module 220. This information can then be processed (e.g., using processing module 230) and/or stored (e.g., using database module 210). As another example, information from the financial platform 140 (e.g., information stored on database module 210) can be transmitted to one or more client computing systems 120a-c through communication module 220.

The processing module 230 processes data stored or otherwise accessible to platform 140. For instance, the processing module 230 can execute automated or user-initiated processes that manipulate data pertaining to one or more users and their financial portfolios. As an example, the processing module 230 can manipulate data stored on database module 210, or data that is received from communications module 220. Likewise, processed data from the processing module 230 can be stored on database module 210 and/or sent to communications module 220 for transmission to other computing systems. Example processes that can be performed by the processing module 230 are described in greater detail herein.

In an example implementations of the architecture 100, a user accesses the financial platform 140 using a client computing device 120a-c. The user can, for example, create an account with the financial platform 140 and input personal information regarding themselves (e.g., name, contact information, identification credentials, and so forth). The user can also input information regarding the current state of their financial portfolio. This can include, for instance, inputting the assets that are held in their financial portfolio, and the amount of value allocated to each asset (e.g., the number of shares or units held by the user).

The user can also input preferences regarding how they would like to manage their portfolio. Portfolio preferences can include, for example, an overall objective for their portfolio (e.g., whether they would like to maximize the financial returns on their portfolio, preserve capital, earn dividend income, and so forth). Portfolio preferences can also include the user's risk tolerance (e.g., the amount of risk that the user is willing to tolerate in pursuit of their objectives). Portfolio preferences can also include an indication regarding whether to conduct certain types of transactions (e.g., whether to conduct short sales, or other types of transactions). Portfolio preferences can also include the maximum leverage of their portfolio (e.g., the gross value of the portfolio as a ratio of the total equity in the user's financial account). Portfolio preferences can also include a particular volatility target of the portfolio (e.g., an estimated standard deviation of returns of the portfolio). Portfolio preferences can also include other preferences, such as the minimum annual dividend income of the portfolio, a single-position concentration limit (e.g., the maximum amount that can be invested in a single stock as a percentage of the total equity in the user's financial account), a cash reserve minimum (e.g., the minimum amount of money required to be left in cash or money market, and not invested in stocks or other assets), a range for beta constraints (e.g., the range of a portfolio's market risk relative to the risk of a broad stock index), and a range for allocation per asset (e.g., a minimum and maximum amount of the portfolio that can be invested in a particular stock). Although example portfolio preferences are described, these are merely illustrative examples. In practice, a user can input other portfolio preferences, either instead of or in addition to those described herein.

Further, the user can also input information regarding their social connections. For example, the user can provide the identity of one or more other users of the financial platform 140. As another example, the user can provide identity credentials for the social media platform 160, and the financial platform 140 can automatically retrieve the user's social connections from the social media platform 160.

Further, the user can also input predictions regarding particular assets being traded on a financial market. Such inputs can be entered by the user, or calculated or defaulted to certain values by the financial platform 140. For example, a user can identify a particular asset (e.g., a stock, bond, commodity, or other asset), can indicate the predicted future direction of the asset's value (e.g., whether the asset will increase in value, decrease in value, or remain the same value in the future). The user can also specify a price target for the asset (e.g., the price that the user expects the asset to reach on the financial market), and a specified time in the future that they expect the target price to be met (e.g., a horizon). In some cases, the user can also input a conviction level for their predictions (e.g., how confident the user is that the price of the asset will reach the price target). In some cases, the user can also input an expected dividend for the asset (e.g., the asset's expected dividend yield over a period of time, such as 12 months). In some cases, the user can also input a thesis regarding their prediction. A thesis can include, for example, a particular reason why the user believes that the asset will behave in the predicted manner. Example reasons could include the value of the asset versus the current market price (e.g., whether the asset represents a good or bad value), the skills of a management team associated with the asset (e.g., whether the skills of the management team of a corporation are good or bad), and/or an upcoming event (e.g., whether an upcoming event will cause the price of an asset to increase or decrease). In some cases, the user can also enter notes or free-form comments (e.g., a narrative explaining their prediction).

In some cases, the user can also enter free-form statements or "thoughts" regarding an asset, and submit those comments for voting by other users. As examples, a user can enter opinions regarding an asset (e.g., an opinion regarding the strength or value of an asset), opinions regarding a particular company or corporate management team (e.g., opinions regarding the performance of a company or corporate management team), opinions regarding products or services offered by a company (e.g., the quality of a product or service), or other opinions, assessments, or characterizations.

Other users can vote in support of the statement (e.g., if they agree with the statement), or vote against the statement (e.g., if they disagree with the statement). The voting results can be displayed to each of the users, or to each of the users to whom the original author of the statement is connected (e.g. on the social media platform 160), such that they can assess the popularity of each statement.

In some cases, statements can be filtered and/or sorted according to their vote totals. For instance, statements can be displayed in the form of a list, and sorted by their net vote totals. As an example, a statement having a relatively high net vote total (e.g., the number of votes in support of the statement, minus the number of votes against the statement) can be displayed higher on the list. A statement having a relatively low net vote total can be displayed lower on the list. In some cases, statements having a sufficiently low net vote total (e.g., a net vote total below a threshold value) can be deemphasized (e.g., greyed out) or hidden from view.

In some cases, a user can enter voteable statements as a part of a prediction. In some cases, a user can enter voteable statements independently of a prediction (e.g., as a standalone statement).

In some cases, voteable statements can be limited in length. As an example, voteable statements can be limited to no more than 100 characters, or according to some other character limit.

In some cases, a user can solicit voteable statements from other users. For instance, a first user viewing a second user's prediction can request that the second user explain the prediction, or a particular aspect of the prediction. In response, the second user can enter a statement elaborating further on their prediction (e.g., an explanation of the basis of their prediction, an opinion supporting their prediction, and so forth). Other users can vote in support of or against the statement, and the results can be displayed to other users, such that they can gauge the level of popular support for the statement.

As described herein, information regarding a user's predictions can be formatted according to a data structure. For example, a user can input information regarding their predictions into a client computing system 102a-c, and the client computing system 102a-c can format the prediction into an individual data structure, where each field or entry of the data structure corresponds to a different aspect of the prediction. For instance, a first field of the data structure can contain an identity of an asset, a second field can contain an indication of the asset's predicted direction, a third field can contain an indication of the target price, a fourth field can contain an indication of the horizon for the target price, and so forth. This arrangement can be uniform across each of the computing systems in the architecture 100. Thus, each prediction is formatted in a consistent manner, and can be reliably shared and interpreted by each of the computing systems in the architecture 100.

Similarly, information regarding a user's voteable statements or "thoughts" also can be formatted according to a data structure. For example, a user can input information regarding their statements into a client computing system 102a-c, and the client computing system 102a-c can format the information into a data structure. For instance, a first field of the data structure can contain an identity of an asset, a second field can contain the text of the statement, a third field can contain an indication of whether the statement expresses a positive view (e.g. a "pro" tag) or negative view (e.g. a "con" tag) about the asset, a fourth field can identify the user that made the statement, and so forth. The client computing system 102a-c can transmit the data structure to the financial platform 140, such that information regarding the statements can be displayed to other users. As users vote for or against the statements, the financial platform 140 can update the data structure to indicate the voting results (e.g., using a field containing an indication of the number of positive votes, and a field containing an indication of the number of negative votes for each statement). The data structure can also include fields for other relevant information regarding each statement. For example, the data structure can include a field indicating the identities of all users who have voted for or against the statement. This arrangement can be uniform across each of the computing systems in the architecture 100. Thus, each voteable statement is formatted in a consistent manner, and can be reliably shared and interpreted by each of the computing systems in the architecture 100. As such, users can share ideas about an asset, poll the community for their opinion about the asset, and review the results in an intuitive manner.

The client computer 120a-c transmits the information inputted by the user to the computing system 110a and the financial platform 140. The financial platform 140 stores the information in the database module 120, such that the user can access the information at a later time. In addition, the financial platform 140 aggregates the user's predictions (e.g., the data structures pertaining to the user's predictions) with predictions received from one or more other users. In some cases, the financial platform 140 can generate and maintain one or more structured databases that include a record of each of the predictions made by one of its users, and information regarding each of the predictions.

In some implementations, the financial platform 140 allows the user to access predictions made by other users. As an example, the financial platform 140 can retrieve information regarding a user's social connections from the social media platform 160, determine whether any of the user's social connections are users of the financial platform 140, and if so, automatically present those users' predictions to the user. This is beneficial, for example, as it allows a user to quickly view predictions made by their social acquaintances.

As another example, the user can manually input the identities of one or more users of the financial platform 140 (e.g., by inputting a user name, e-mail address, or other identifying information regarding those users). In response, the financial platform 140 can retrieve the predictions made by the identified users, and present those users' predictions to the user. This is beneficial, for example, as it allows a user to manually select particular people whose predictions they wish to view.

As another example, the financial platform 140 can display a number of users of the financial platform 140, and the user can select one or more of those users to view their predictions. This can be beneficial, for example, as it allows a user to browse through a number of other users, and select users or predictions that interest them.

As another example, the financial platform 140 can display a number of individuals or organizations who are not users of the financial platform 140, but have publicly known predictions. This can include, for example, well known investors, pundits, thought leaders, people of influence, analysts, journalists, investment banks, think tanks, research firms, or other such individuals or organizations. Information regarding these individuals or organizations and their predictions can be manually entered (e.g., by an administrator or user of the financial platform 140) and/or automatically obtained (e.g., automatically retrieved from the individuals' or organizations' publications), and presented to the users of the financial platform 140 for review.

In some cases, the financial platform 140 can display several different users and/or predictions, and allow the user to browse through each of the users and/or predictions. As the user browses through the users and/or predictions, the user can select particular users and/or predictions that interest them, and save them for later (e.g., in a "favorite" or "following" or "connections" list).

In some implementations, the financial platform 140 can automatically suggest users and/or display predictions to a user, even if the user was not previously associated with those users and/or predictions. For example, the financial platform 140 can automatically identify other users having similar trading patterns as the user, and display those users and their corresponding predictions. As another example, the financial platform 140 can automatically identify other users having similar portfolio preferences as the user, and display those users and their corresponding predictions. As yet another example, the financial platform 140 can automatically identify other users who have similar portfolio compositions as the user, and display those users and their corresponding predictions. As yet another example, the financial platform 140 can automatically identify other users who have similar demographic information as the user, and display those users and their corresponding predictions.

In some implementations, the financial platform 140 can display information regarding another user's portfolio allocation. For example, the financial platform 140 can display each of the assets held by another user, and the percentage of their portfolio's value that corresponds to each asset. This can beneficial, for example, as it allows a user to examine the portfolio allocations of others, and adjust their own portfolio accordingly. For instance, a user might see that numerous other people have concentrated a significant portion of their portfolios on a particular asset. In response, the user can select that asset for purchase or sale. As another example, a user might see that relatively few other people have invested in a particular asset. In response, the user can select that asset for purchase or sale.

In some cases, a user can search or filter the users and/or predictions to identify particular users and/or predictions that match their criteria. For example, a user can filter a list of users based on name, social network connection, demographic, and so forth. As another example, a user can filter predictions based on the asset that is the subject of the prediction, the predicted direction of that asset, the target price of that asset, and so forth. As another example, a user can filter predictions based on a particular thesis identified by the predictor, or based on a particular note entered by the predictor. In some cases, a user can search or filter using several different criteria to narrowly identify a specific user or prediction.

The user views each of these predictions, and selects one or more predictions (e.g., their own predictions and/or predictions from other users, individuals, or organizations) that they wish to make active in their portfolio. In response, the financial platform 140 determines one or more transactions that can be performed based on those selected active predictions. As described herein, the financial platform 140 can determine one or more trades of an asset based on the past and present state of a financial market (e.g., information received from the financial market database 150), the predicted future states of the financial market (e.g., the user's selected predictions), and the user's portfolio preferences. These trades, when executed, can optimize, improve, or otherwise modify the user's portfolio in accordance with their predictions, the predictions of others, their preferences, and/or their objectives.

In some cases, users can selectively share information with others. This can be beneficial, for example, if a user wishes to maintain their privacy by sharing certain types of information with a selected group of people, while not sharing other types of information at all. As an example, a user can publicly share information regarding their predictions with each of the users of the financial platform 140, but share information regarding their portfolio allocations with only a select number of users (e.g., users with whom they are connected on a social media platform 160). As another example, a user can share information regarding their predictions with a select number of users (e.g., users that they have specifically identified on the financial platform 140), and not share information regarding their portfolio allocations at all. These examples are provided merely to illustrate how a user can selectively or non-selectively share or opt not to share information. In practice, users can selectively or non-selectively share or opt not to share information however they wish.

In some implementations, the financial platform 140 can display information to users using notifications or "feeds." For instance, the financial platform 140 can generate a message and/or image describing particular events that have occurred with respect to the user and their portfolio, and display those messages and/or images to the user for review. As an example, the financial platform 140 can generate a message and/or image indicating the performance of a particular asset held by the user in their financial account (e.g., a notification indicating that a particular stock has increased in value by a particular percentage over a particular period of time). As another example, the financial platform 140 can generate a message and/or image indicating when the user performed a particular action (e.g., a notification indicating that the user last optimized their portfolio at a particular point in time in the past). As another example, the financial platform 140 can generate a message and/or image indicating that the projected return of the user's optimized portfolio exceeds the expected return of their actual portfolio by a threshold amount (e.g., a notification that optimizing the portfolio would result in an increase in the modeled return of the financial portfolio that is at least a certain percentage). In some implementations, the user can select the message and/or image to obtain further information regarding the selected event.

In some implementations, the financial platform 140 can generate a message and/or image for particular events that have occurred with respect to other users and their respective portfolios, and display those messages and/or images to the user to review. As an example, the financial platform 140 can generate a message and/or image indicating the performance of a particular asset held by one or more other users in their financial accounts (e.g., a notification indicating that a particular stock held by one of the user's "friends" or "connections" has increased in value by a particular percentage over a particular period of time). As another example, the financial platform 140 can generate a message and/or image indicating the actions performed by one or more other users (e.g., a notification indicating that one of the user's "friends" or "connections" conducted a particular transaction with respect to a particular asset). As another example, the financial platform 140 can generate a message and/or image indicating that another user shared a prediction (e.g., a notification indicating that one of the user's "friends" or "connections" has predicted that a particular asset will perform in a particular manner). As another example, the financial platform 140 can generate a message and/or image providing additional information regarding a shared prediction (e.g., a notification indicating the identity of the user's "friend" or "connection" who shared a prediction, an indication of the particular financial asset of the financial market identified by the prediction, and an indication of a predicted future price or return of that financial asset). As another example, the financial platform 140 can generate a message and/or image indicating that two or more users interacted on a social media platform (e.g., a notification indicating that one of the user's "friends" or "connections" has "friended," "connected with," "liked," or otherwise associated themselves with another user on a social media platform).

In some implementations, multiple notifications can each be presented individually (e.g., as a series of sequentially displayed messages) or concurrently (e.g., as a list or "feed"). These notifications can be beneficial, for example, as they allow the users of the financial platform 140 to quickly review information relating to their own financial accounts, one or more other users of the financial platform 140, and/or the financial accounts held by those other users.

Although example notifications are described above, these are merely illustrative examples. In practice, other notifications are also possible, either instead of or in addition to those described above.

Figure 3:
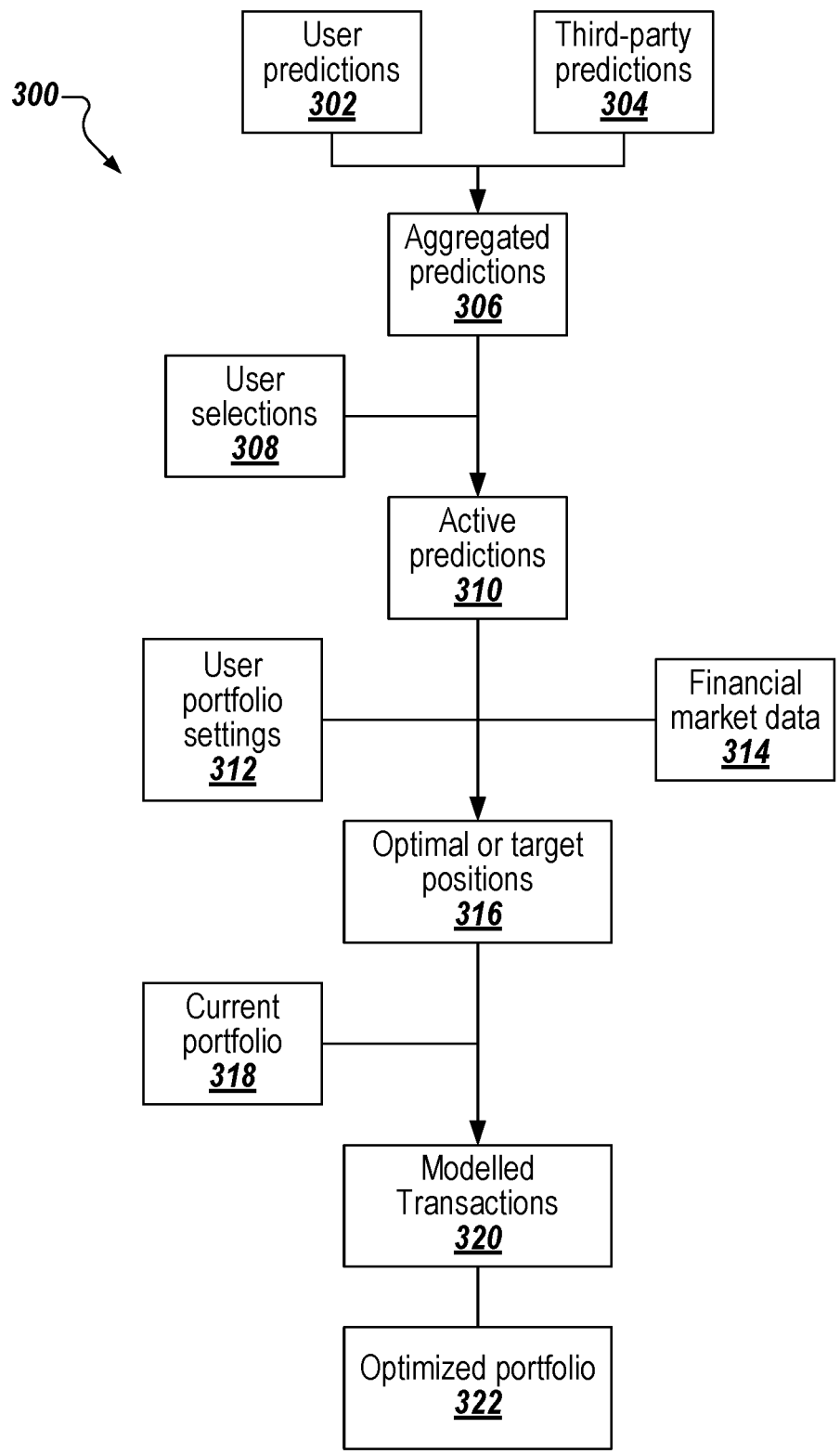
FIG. 3 depicts an example process that can be executed in accordance with implementations of the present disclosure.

A generalized process 300 for generating transactions is shown in FIG. 3. As described herein, these transactions can be modelled transactions, simulated transactions, transactions that are automatically executed on behalf of a user, or other transactions that optimize, improve, or otherwise modify the user's financial portfolio. The process 300 can be performed, for example, by the processing module 230 of the financial platform 140.

A user's predictions (302) and third-party predictions (304) are combined into an aggregated set of predictions (306). As described herein, a user's predictions can include predictions regarding the predicted performance of one or more assets traded on a financial market. Further, third party predictions can include predictions inputted by one or more other users (e.g., one or more other users of the financial platform 140) and/or publicly known predictions made by other individuals or organizations. As described herein, these predictions can be represented using data structures having pre-defined arrangements, and aggregated into one or more structured databases.

One or more of these predictions are presented to the user. The user reviews the predictions, and selects one or more predictions that interest them (308), thereby "activating" the predictions with respect to their portfolio (310). Based on the active predictions (310), the user's portfolio settings (312), and information regarding the financial market (314), optimal or target positions are determined with respect to the financial market (316). The optimal or target positions can include, for example, the identity of one or more assets, and the amount of each asset that should be held in the user's portfolio.

The optimal or target positions are compared with the current state of the portfolio (318) to determine one or more modelled transactions (320). The modelled transaction can be, for example, one or more transactions that can be executed against the current portfolio to realize the optimal or target positions (322).

As described herein, this information can be represented using data structures having pre-defined arrangements. For example, a user's portfolio settings can be represented by one or more data structures (e.g., one or more data structures having particular fields or entries for each respective preference). Similarly, information regarding the financial market can be represented by one or more data structures (e.g., one or more data structures having particular fields or entries for each asset or group of assets). Similarly, information regarding the optimized or target positions can be represented by one or more data structures (e.g., one or more data structures having particular fields or entries for each position). Similarly, information regarding the transactions can be represented by one or more data structures (e.g., one or more data structures having particular fields or entries for each transaction).

As described herein, in some implementations, these transactions, when executed, can optimize, improve, or otherwise modify the user's portfolio in accordance with their predictions, the predictions of others, their preferences, and/or their objectives.

Optimal or target positions can be determined in various ways. For example, in some implementations, an optimal or target position can be computationally determined using an optimization model, such as a Markowitz mean variance (MMV) model or modified MMV model. MMV or modified MMV models can be used, for instance, to maximize a portfolio's expected return based on particular parameters, such as a predicted future state of an asset, a given amount of portfolio risk, restrictions on the types of transactions that can be performed, a range of allowable asset allocations, and other such inputs.

In some implementations, these parameters can be determined based on the user's selected predictions. For example, as described herein, a prediction can contain information regarding a predicted direction of an asset. This predicted direction can be used as a constraint in an optimization model. In some implementations, assets having a predicted upward direction (e.g., corresponding to a "buy" prediction) will never to sold short, and assets having a predicted downward direction (e.g., corresponding to a "sell" prediction) will never be bought. This can be beneficial, for example, as it can restrict the optimization model from outputting a transaction or position contrary to the user's predictions.

As another example, as described herein, a prediction can contain information regarding a predicted price of an asset, and a specified period of time in which the asset is predicted to achieve that price (e.g., a horizon). In some cases, the difference between the price target and the current price can be incremented by the expected dividends of the asset to arrive at an expected return, which in turn can be used as an input in an optimization model. This can be beneficial, for example, as it allows for returns to be calculated continuously based on live market data and the user's input price targets, yielding real-time expected returns. This allows the financial platform 140, for example, to notify users when one of their held assets has exceeded its target price and the position now has zero or negative expected returns, signaling an exit point for the optimization model. Further, the optimization model can normalize predictions according to a standard timeframe (e.g., 12 months), and automatically annualize returns over other periods of time. This can be beneficial, for example, as performing automatic annualization of numbers expressed over other timeframes can be a convenience for the user. This can also be beneficial, for example, to ensure that projected returns are inputted to the optimization model using a standardized convention for timeframe.

As another example, as described herein, a prediction can contain information regarding the predictor's conviction level regarding their prediction. In some implementations, the predictor can input a numerical value representing how confident they are about the price target that they have inputted (e.g., on a scale of 1 to 5, with 5 being the highest confidence). This information can be translated into position-level maximum allocations, scaled based on the user's risk tolerance settings and/or single-position concentration limit. This can be beneficial, as it allows the optimization model to consider the relative confidence of the predictor such that higher confidence predictions are weighted more heavily than relatively lower confidence predictions.

As another example, as described herein, a prediction can contain information regarding an expected dividend of the asset. For example, the expected dividend could be expressed as an asset's expected dividend yield over a period of time (e.g., 12 months). In some implementations, the expected dividends are added to the user's expected price appreciation when calculating the total expected return for the asset. This can be beneficial, for example, as it allows the optimization model to consider dividends and price appreciation separately or in conjunction, and allows a user to input dividend and price projections separately when making predictions.

In some implementations, these parameters also can be determined based on the user's inputted portfolio preferences. For example, as described herein, a user's portfolio preferences can contain information regarding an overall objective of the portfolio. In some implementations, this overall objective can define the optimization goal for the optimization model (e.g., to maximize returns on the portfolio). Other objectives can be used, depending on the implementation.

As another example, as described herein, a user's portfolio preference can contain information regarding a risk tolerance or risk profile for the user. This can be, for example, a user's self-identified level of risk tolerance. In some implementations, the optimizer can use this risk tolerance to limit the types of transactions that it can output (e.g., by reducing or eliminating transactions that exceed the risk tolerance of the user). In some instances, the overall risk profile selected by the user can be used to set various other preferences to default settings consistent with the risk profile. This can be beneficial, for example, by allowing the user broad control over risk parameters without changing many detailed settings individually.

As another example, as described herein, a user's portfolio preference can contain information regarding whether the user allows for certain types of transactions to be performed (e.g., short sales). This can be beneficial, for example, as certain users may not want to perform certain types of transactions (e.g., due to increased risk or credit requirements).

As another example, as described herein, a user's portfolio preference can contain information regarding the maximum leverage of the portfolio (e.g., the gross value of the portfolio as a ratio of the total equity in the user's financial account). This can be used as a constraint for the optimization model. This can be beneficial, for example, as it provides a specific constraint on leverage, such that the user can specifically control the leverage of their portfolio, as a means of controlling or limiting projected risk.

As another example, as described herein, a user's portfolio preference can contain information regarding a particular volatility of the portfolio (e.g., an estimated standard deviation of returns of the portfolio). This can be used as an overall risk constraint in a mean-variance optimization. In some cases, the volatility can be calculated numerically, but can be presented to the user in the form of a generalized label (e.g., "conservative" volatility). This can be beneficial, for example, as it allows less sophisticated users to understand the effect of this parameter on the optimization model.

As another example, as described herein, a user's portfolio preference can contain information regarding a minimum annual dividend income of the portfolio. This can also be used as a constraint on the optimization model. This can be beneficial, for example, as it allows a user to prioritize assets based on dividend income (a source of income that may be particularly important to some users, such as retirees).

As another example, as described herein, a user's portfolio preference can contain information regarding a single-position concentration limit (e.g., the maximum amount that can be invested in a single asset as a percentage of the total equity in the user's account). This can be used as a constraint in the optimization model, and can be used in conjunction with conviction level to limit the maximum concentration in a particular security. This can be beneficial, for example, as it allows a user to control the diversification of their portfolio (e.g., by specifying that the portfolio be well-diversified under certain circumstances). For instance, if an asset (ABC) has a very negative expected return and is also highly correlated to another asset (XYZ), the optimization model might, in the absence of this feature, return a portfolio that is allocated −200% to ABC and +200% to XYZ, with small or zero allocations to other assets. This parameter enforces a better diversification of allocations.

As another example, as described herein, a user's portfolio preference can contain information regarding a cash reserve minimum (e.g., the minimum amount of money required to be left in cash or money market, and not invested in stocks or other assets). This can be used to reduce the overall portfolio size. This can be beneficial, for example, as it provides an additional means to modulate risk by limiting overall market exposure. For instance, some investors may wish to keep a cash balance in their account for emergencies, or they may have a large upcoming outlay such as a car purchase, tuition payment, or down payment on real estate.

As another example, as described herein, a user's portfolio preference can contain information regarding a range for beta constraints (e.g., the range of a portfolio's market risk relative to the risk of a broad stock index). This can be used as a parameter in the optimization model. This can be beneficial, for example, as it allows the user to modify their overall market exposure. As an example, a user who suddenly becomes nervous about the stock market might decide to reduce overall risk by 50%. With this single parameter, the user can reduce their estimated beta from 1.0 to 0.5, cutting market exposure in half.

As another example, as described herein, a user's portfolio preference can contain information regarding a range for allocation per asset (e.g., a minimum and maximum amount of the portfolio that can be invested in a particular stock). This can be used as a per-position constraint for the optimization model. This can be beneficial, for example, as it allows users to override the optimization results from the optimization model, and instead require a certain allocation, or range of allocations, for any specific stock. The optimization model can then maximize returns subject to this extra condition or set of conditions.

In some implementations, these parameters can be determined based on market data (e.g., information obtained from the financial market database 150). This can include, for example, live or delayed market prices (during trading hours) or recent closing prices (when markets are closed). The current prices for each asset can be used to compute the expected returns of each asset given the price target, estimated dividend, and horizon in the corresponding prediction. As the market data changes, the optimization model can account for these changes, and update its optimal or target positions in response. In some cases, market data can also include one or more covariance matrices that include pairwise covariances between the historical returns of assets of a particular financial market. This can be used, for example, to assess how correlated assets are to each other and the risk associated with each asset.

As described herein, the modelled transactions can be determined by comparing the current state of the user's portfolio with a target state of the portfolio determined by the optimization model. That is, the modelled transactions can represent a series of transactions that can be executed to align the current state of the financial portfolio to the optimal or target state. For example, a user's portfolio might be allocated such that 50% of its value is held in a stock A, and 50% of its value is held in a stock B. Based on the user's predictions, the predictions of others, their preferences, and/or their objectives, the optimization model determines that the optimal or target state of the portfolio allocates 25% of its value to the stock A, 25% of its value to the stock B, and 50% of its value to a stock C. Thus, the financial platform 140 can output a series of transactions in which a portion of stock A corresponding to 25% of the value of the portfolio is sold, a portion of stock B corresponding to 25% of the value of the portfolio is sold, and a portion of stock C corresponding to 50% of the value of the portfolio is purchased.

In some implementations, the user can instruct the financial platform 140 to execute the transactions. In this case, the modelled transactions (320) are executed against the current portfolio (318), resulting in an optimized (or otherwise modified) portfolio (322). In some implementations, the financial platform 140 can automatically execute transactions continuously, periodically, or according to some other arbitrary period, such that the portfolio is automatically optimized (or otherwise modified) over time.

In some implementations, however, the financial platform 140 need not actually execute the financial transactions. For example, in some implementations, the financial platform 140 can output one or more modelled transactions, and track the simulated performance of those transactions and corresponding portfolio over a period of time, as if they actually had been executed in a real-world financial market. This can be beneficial, for example, as it enables users to evaluate the performance of the financial platform 140 over a period of time without conducting actual transactions in a real-world financial market. This also can be beneficial, for example, as it enables users to view modelled or simulated trades in a low-risk environment.

As described herein, the financial platform 140 can represent and store information using one or more data structures having pre-defined arrangements.

As an example, the financial platform 140 can store information regarding the state each user's financial portfolio using one or more structured database tables. The database table can include one or more records (e.g., one or more "columns" or "rows" of data fields), each containing information regarding a particular user's financial portfolio. For instance, each record of a database table can include a unique identifier associated with the record (e.g., an integer or alphanumeric sequence uniquely identifying the record in the database table), a unique identifier associated with a particular user (e.g., an integer or alphanumeric sequence uniquely identifying the user), and timestamps indicating particular actions that the user took with respect to the account (e.g., when the user created the account, when the user last updated the account, and so forth).

As another example, the financial platform 140 can store information regarding its users' transactions with respect to their financial portfolios using one or more structured database tables. For instance, each record of a database table can include a unique identifier associated with a particular financial transaction (e.g., an integer or alphanumeric sequence uniquely identifying the transaction), a unique identifier associated with the user that conducted the transaction (e.g., an integer or alphanumeric sequence uniquely identifying the user), a unique identifier associated with the recipient of the transaction (e.g., an integer or alphanumeric sequence uniquely identifying the recipient), the value of the transaction (e.g., in the form of a double precision floating point number), an indication of whether the transaction pertained to real-money or simulated trading (e.g., in the form of a Boolean value), a timestamp indicating when the transaction took place, and/or fields indicating other parameters related to the transaction.

As yet another example, the financial platform 140 can store information regarding its users' portfolio settings (e.g., the user portfolio settings 312) using one or more structured database tables. For instance, each record of a database table can include a unique identifier associated with the record (e.g., an integer or alphanumeric sequence uniquely identifying the record in the database table), a unique identifier associated with a particular user (e.g., an integer or alphanumeric sequence uniquely identifying the user), a unique identifier associated with a particular security or asset (e.g., an integer or alphanumeric sequence uniquely identifying the asset or security), indications of the minimum and maximum allowable allocations that the user has selected for a particular asset or security (e.g., in the form of integers), and/or timestamps indicating when the constraint was created and/or last modified.

As yet another example, the financial platform 140 can store information regarding the connections or associations between its users (e.g., the connections or associations between its users on the social media platform 160) using one or more structured database tables. For instance, each record of a database table can include a unique identifier associated with the record (e.g., an integer or alphanumeric sequence uniquely identifying the record in the database table), a unique identifier associated with a first user (e.g., an integer or alphanumeric sequence uniquely identifying the first user), a unique identifier associated with another user connected to the first user (e.g., an integer or alphanumeric sequence uniquely identifying the other user), fields indicating the users' identifiers on a social media platform (e.g., user names, e-mail addresses, and so forth), and/or fields indicating profile information associated with the users (e.g., contact information, textual content shared by the users, and/or photographs, videos, or other media shared by the users).

As described herein, users can modify their connections or associations with other users on the social media platform (e.g., by "inviting" other users to connect with them). Information regarding these invitations can be stored using one or more structured database tables. For instance, each record of a database table can include a unique identifier associated with the record (e.g., an integer or alphanumeric sequence uniquely identifying the record in the database table), a unique identifier associated with the user who initiated the invitation (e.g., an integer or alphanumeric sequence uniquely the user who initiated the invitation), a unique identifier associated with the invitee (e.g., an integer or alphanumeric sequence uniquely the user who received the invitation), a unique token that was sent to the invitee (e.g., a token that the invitee can use to accept the invitation), and/or timestamps indicating when the invitation was created, updated, and/or deleted.

As described above, the transactions outputted by the financial platform 140 can be executed on a financial market. In some cases, these transactions can be executed by transmitting instructions to a third party (e.g., a clearing broker firm) using the communications module 220. Such instructions could be encoded, for example, in the FIX specification for financial messaging, and a database table can include a record for each instruction. For instance, a record can include a FIX message (e.g., in the form of a string), an order identification number (e.g., in the form of an integer), a message direction field to indicate whether it is an incoming or outgoing message from the communications module 220 (e.g., in the form of a string), and/or timestamps indicating when the message was sent, received, and/or revised.

As yet another example, the financial platform 140 can store information regarding its users' predictions about assets on a financial market using one or more structured database tables. For instance, each record of a database table can include a unique identifier associated with the record (e.g., an integer or alphanumeric sequence uniquely identifying the record in the database table), a unique identifier associated with a user who is utilizing the prediction (e.g., an integer or alphanumeric sequence uniquely identifying the user who selected and/or activated the prediction), a predicted future price or return for the asset (e.g., in the form of a double precision floating point number), the confidence of the user in this prediction (e.g., in the form of an integer), the user's projected dividend yield or payment for the asset (e.g., a double precision floating point number), the time horizon over which the user expects the projected performance to be realized (e.g., in the form of an integer representing a number of days, months, or years), the type of investment thesis represented by the idea (e.g., an integer or string indicating "growth," "value," or other theses), a unique identifier associated with a user who created the prediction (e.g., an integer or alphanumeric sequence uniquely identifying the user who made the prediction), an indication whether or not the asset and its projection are active within the user's portfolio (e.g., a Boolean), and/or timestamps indicating the times at which various events occurred in relation to the projection, such as its creation, modification, and/or deletion.

As yet another example, the financial platform 140 can store information regarding its users' "thoughts" or statements about assets of a financial market of predictions relating to these assets. For instance, each record of a database table can include a unique identifier associated with the record (e.g., an integer or alphanumeric sequence uniquely identifying the record in the database table), a unique identifier associated with a user who made the statement (e.g., an integer or alphanumeric sequence uniquely identifying the user who made the statement), a unique identifier associated with a particular security or asset (e.g., an integer or alphanumeric sequence uniquely identifying the asset or security), a text field containing the thought text entered by the user (e.g., a string), a field indicating whether the statement expresses positive view (e.g., a "Pro" label) or a negative view (e.g., a "Con" label) (e.g., a string), an indication of whether the user agrees or disagrees with the statement (e.g., a Boolean), and/or timestamps indicating the times at which various events occurred in relation to the statement, such as its creation, modification, and/or deletion.

As yet another example, information regarding one or more financial markets (e.g., information maintained by the financial market database 150) can be stored using one or more structured database tables. For instance, each record of a database table can include a unique identifier associated with the record (e.g., an integer or alphanumeric sequence uniquely identifying the record in the database table), a unique identifier associated with a particular security (e.g., an integer or alphanumeric sequence uniquely identifying the security), the ticker symbol of the security (e.g., in the form of a text string), the exchange on which the security trades (e.g., in the form of an integer representing the exchange), the security's quoted currency (e.g., in the form of a string), codes representing the security in other platforms or systems (such as market data systems, trading systems, or financial quotation systems) (e.g., in the form of integers), the total market capitalization of the company (e.g., in the form of an integer), the type of security (for example, a stock, exchange-traded fund, or depository receipt) (e.g., in the form of an integer), an average analyst price estimate for the security (e.g., a floating point number), and/or other types of information.

In some implementations, the processing module 230 of the financial platform 140 can generate a list of orders, which can be stored, for example, as records contained in a database table. This table can be passed to the communications module 220 within the financial platform 140 for further processing and conveyance to a third party for trade execution, or to a simulated environment within financial platform 140 that can record such trades without placing actual securities transactions in real-world financial markets. For instance, each record of a database table can include a unique identifier associated with the record (e.g., an integer or alphanumeric sequence uniquely identifying the record in the database table), a unique identifier associated with the user placing the trade (e.g., an integer or alphanumeric sequence uniquely identifying the user), a unique identifier associated with the asset being traded (e.g., an integer or alphanumeric sequence uniquely identifying the asset), an order type (e.g., in the form of an integer representing the order type), a financial projection upon which the trade is based (such as, for example, a price target, time horizon, and/or confidence level) (e.g., in the form of one or more integers and/or double precision floating point numbers), the number of shares to be traded (e.g., in the form of an integer), a limit price (e.g., in the form of a double precision floating point number), an estimated commission (e.g., a double precision floating point number), the total value of the order (e.g., in the form of a double precision floating point number), and/or timestamps indicating when the order was placed, updated, and/or executed.

In some implementations, information about all users of the financial platform 140 and social media platform 160 can be maintained in a database table. For instance, each record of a database table can include a unique identifier associated with the record (e.g., an integer or alphanumeric sequence uniquely identifying the record in the database table), a unique identifier associated with a particular user (e.g., an integer or alphanumeric sequence uniquely identifying the record in the user), an email address of the user (e.g., in the form of a text string), the user's password (e.g., in the form of an encrypted text string), a profile photo of the user for their social media profile (e.g., in the form of an image, image information encoded as a text string, or binary information), their contact information (such as an e-mail address, telephone number, mailing address, and so forth) (e.g., in the form of a text string), and/or biographical text (e.g., in the form of a text string). Such a table can also contain information about each user's portfolio settings such as their maximum allowable financial leverage in the account (e.g., in the form of a double precision floating point number), an indication of whether they want to participate in short sales (e.g., in the form of a Boolean), their maximum target concentration in a single position (e.g., in the form of a double precision floating point number), their minimum and maximum target portfolio beta (e.g., in the form of double precision floating point numbers), among other types of information.

Pseudo-code representing example data structures are provided below. However, it is appreciated that these are merely illustrative examples. In practice, other data structures and arrangements are possible, depending on the implementation.

```
database table "user_accounts"
    int account_id
    int unique_user_id
    timestamp time_created
    timestamp last_updated
database table "user_activities"
    int unique_user_id
    int unique_transaction_id
    int recipient_id
    double transaction_value
    bool simulated_trade, default=TRUE
    timestamp activity_time
database table "portfolio_settings"
    int unique_user_id
    int security_id
    int_min_allocation
    int max allocation
    timestamp time_created
    timestamp last_updated
database table "social_connections"
    int requester_id
    int invitee_id
    bool accepted, default=FALSE
    timestamp time_created
    timestamp last_updated
database table "third_party_social_media"
    int unique_user_id
    int third_party_id
    string email_address
    string profile_photo
database table "invitations"
    int sender_user_id
    string receiver_email_address
    int invitation_token
    timestamp time_created
    timestamp last_updated
    timestamp time_deleted
database table "trading_messages"
    int unique_user_id
    string fix_message
    int order_number
    string direction
    timestamp time_sent
    timestamp time_received
    timestamp last_updated
database table "predictions"
    int unique_user_id
    int security_id
    double projected_price
    int confidence_level
    double dividend_yield
    int time_horizon_in_months
    int thesis_category
    string thesis_text, required=FALSE
    bool active_prediction
    timestamp time_created
    timestamp last_updated
    timestamp time_deleted
database table "thoughts"
    int unique_user_id
    int security_id
    string thought_text
    string thought_type
    bool user_agrees
    timestamp time_created
    timestamp last_updated
    timestamp time_deleted
database table "market_data"
    int security_id
    string ticker
    int exchange_code
    string currency
    int market_data_id
    int trading_system_id
    int quote_system_id
    int market_cap
    int security_type
    float avg_price_estimate
database table "customer_orders"
    int unique_user_id
    int security_id
    int order_type
    double price_target
    int time_horizon
    int confidence_level
    int order_size
    double limit_price
    double total_order_value
    timestamp order_placed
    timestamp order_updated
    timestamp order_executed
database table "user_list"
    int unique_user_id
```

```
string email_address
string password, encrypted=TRUE
string profile_photo
string mailing_address
string biography
double max_leverage
bool short_sales_allowed
double max_single_position_concentration
double min_beta
double max_beta
```

In some implementations, a user can interact with the financial platform 140 using a graphical user inter (GUI) provided by the financial platform 140. For example, the financial platform 140 can generate a webpage or website, and transmit that webpage or web site to a client computing system 120*a-c*. The user can interact with the webpage or website on their client computing system 120*a-c*, and transmit commands back to the financial platform 140.

Figure 4A:
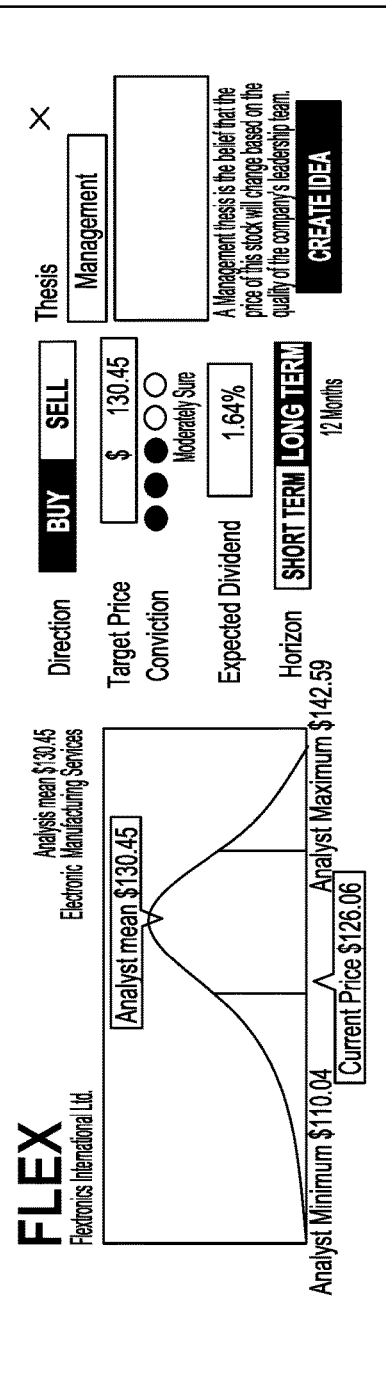

FIG. 4A shows an example GUI 400 that allows a user to view, input, and/or modify information regarding a prediction. The GUI 400 includes various control elements 402 that allow a user to input information regarding their prediction (e.g., the asset, the predicted direction of that asset, the target price, the user's conviction with respect to the prediction, the expected dividend, the horizon, the thesis, and so forth). The GUI 400 can also display a graphical portion 404 that visually depicts information regarding the asset and the prediction (e.g., the current price of the asset, the average target price predicted by market analysts with respect to this asset, the minimum target price predicted by a market analyst, the maximum target price predicted by a market analyst, and so forth).

Figure 4B:
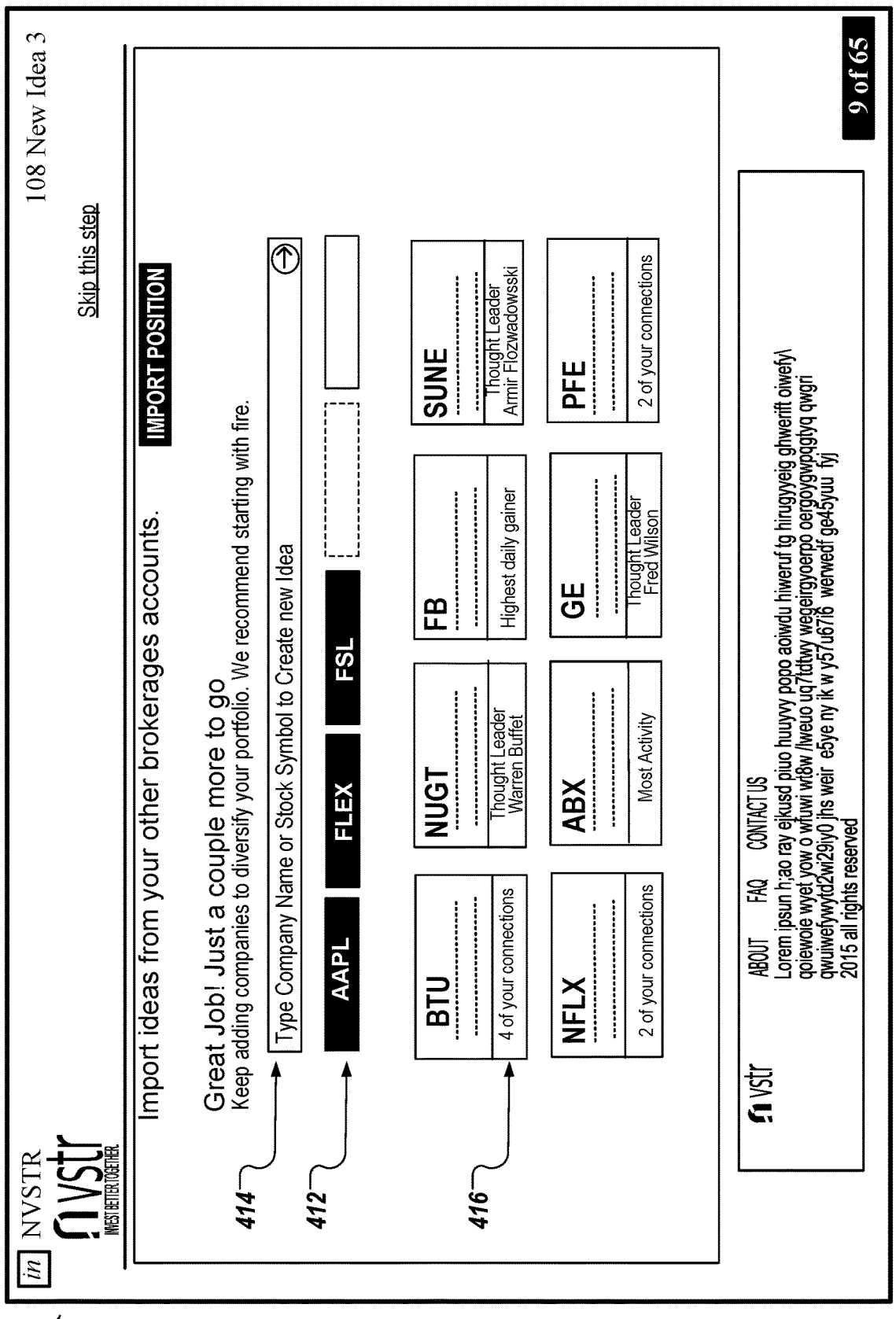

FIG. 4B shows an example GUI 410 that allows a user to create predictions and/or select predictions made by third parties. The GUI 410 includes a number of entry spaces 412. A user can select one of the entry spaces 412, and input a name of an asset in a text box 414. In response, the user can be presented with a GUI to input other information regarding a prediction for that asset (e.g., the GUI 400). The user can also select one of the entry spaces 412, and select one of the third-party predictions displayed in the portion 416. As described herein, the third-party predictions displayed in the portion 416 can be automatically presented by the financial system 140. For example, the financial system 140 can automatically display one or more predictions generated by one or more of the user's social connections, or one or more publicly known predictions (e.g., predictions generated by a well known investor, pundit, thought leader, or so forth). The inputted or selected predictions are displayed in the entry spaces 412, indicating that the user has selected those predictions.

FIG. 4J shows another example GUI 490 that allows users to create predictions and/or elect to include a selection of diversified ETFs or other assets. The GUI 490 includes a dialog 492 enabling a user to enter a voteable statement or "thought" for each prediction, and indicate whether the statement expresses a positive sentiment regarding the asset (e.g., by selecting "Pro" if the user believes that the asset will appreciate) or a negative sentiment for the asset (e.g., by selecting "Con" if the user believes that the asset will depreciate).

Figure 4C:
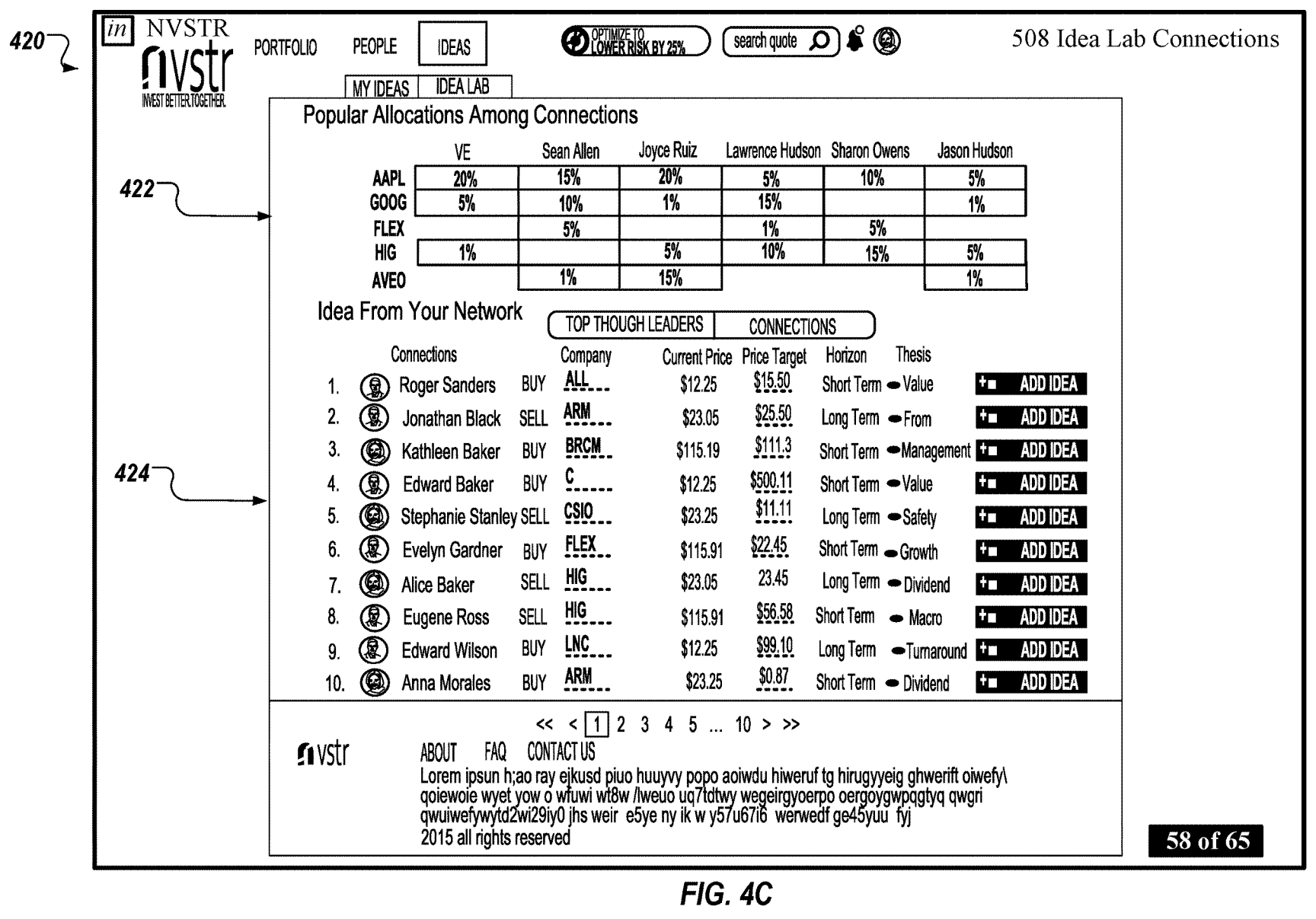

As described herein, in some implementations, a user can view the portfolio allocations of one or more other users. FIG. 4C shows an example GUI 420 that presents a grid 422 displaying the identities of several other users, assets held by those users, and a respective user's allocation of value among each of those assets. This can be useful, as it allows a user to quickly and visually compare their portfolio composition with that of several other users at once. The GUI 420 also includes a portion 424 that presents predictions generated by several other users and/or well known investors, pundits, thought leaders, and so forth. The user can interact with the portion 424, and select predictions to be saved for future review, or to be activated in the user's portfolio.

As described herein, a user can select and save one or more predictions for future review. The user can later examine these predictions, and select particular predictions that they wish to activate with respect to their portfolio (e.g., to generate transactions based on the active predictions). FIG. 4D shows an example GUI 430 for selectively activating and deactivating saved predictions. The GUI 430 includes a listing of each of the predictions 432 that were saved by the user. If the user wishes to activate a particular prediction, they can toggle a control element 434. In response, the GUI 430 can display that prediction using a different font style (e.g., bold), a particular color (e.g., brightly colored), and/or icon (e.g., a green icon), indicating that the prediction has been activated. Inactive predictions can be indicated, for example, using a contrasting font style (e.g., light), a contrasting color (e.g., gray), and/or icon (e.g., a red icon). This is beneficial, for example, as it allows the user to visually ascertain which of the saved predictions have been activated. The user can also revise any of the saved predictions by selecting a control element 436. In response, the financial platform 140 can present the user with a GUI for editing the prediction (e.g., the GUI 400).

Figure 4E:
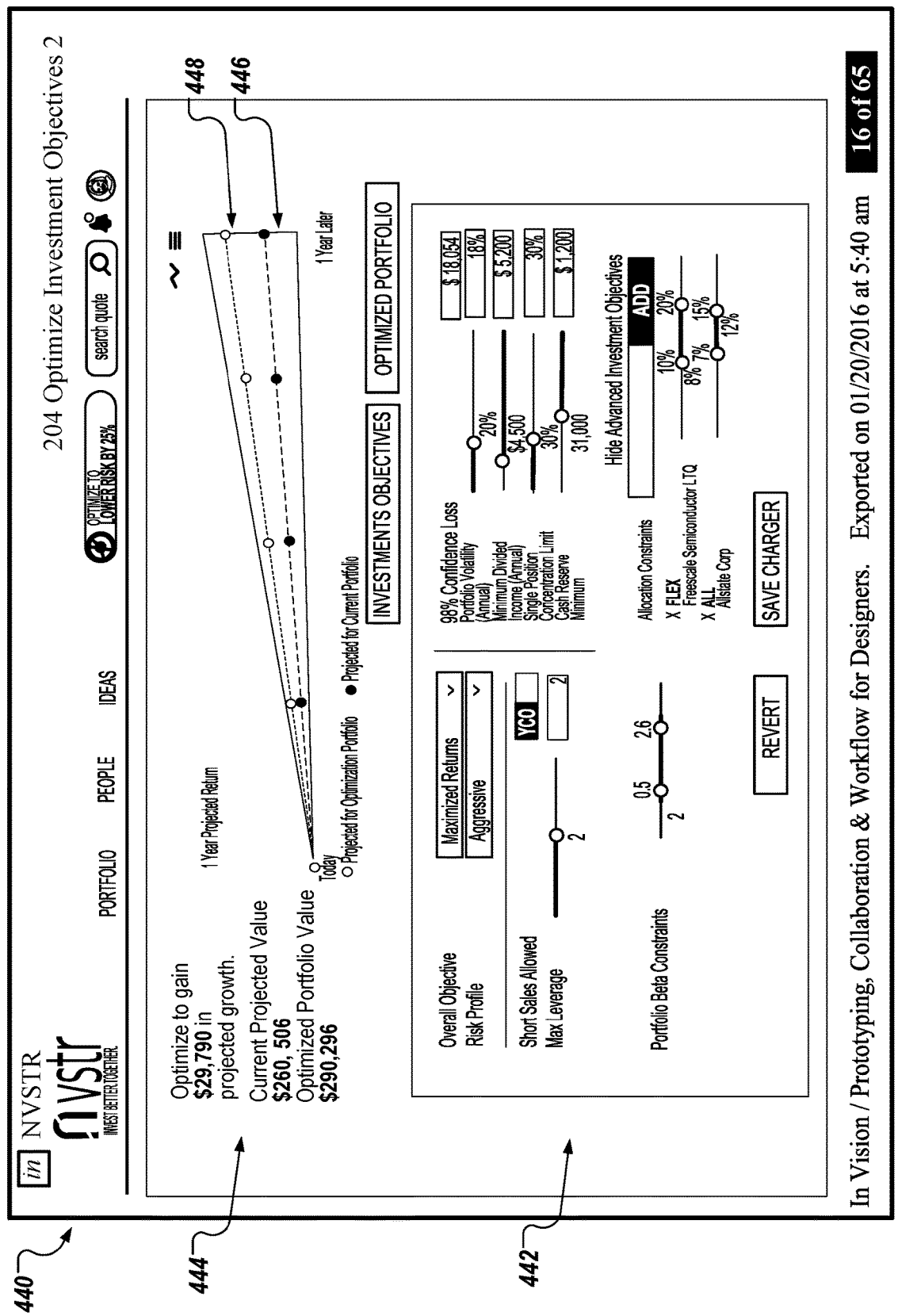

As described herein, a user can input various portfolio parameters that control or influence the transactions that are generated by the financial platform 140 (e.g., modelled or simulated transactions). FIG. 4E shows an example GUI 440 that allows a user to input and revise their portfolio parameters. The GUI includes various control elements 442 that allow the user to input and/or revise portfolio parameters (e.g., overall objective, risk profile, portfolio volatility, minimum dividend, and so forth). The GUI 440 also includes a graphical portion 444 that visually depicts the predicted or potential future state of the portfolio based on the portfolio settings. For example, the graphical portion 444 can display a range 446 of predicted values for the portfolio if no future transactions were to be made, and a range 448 of predicted values for the portfolio based on the current portfolio settings and the transactions determined based on those current portfolio settings. While this illustration presents the information in graphical form, it is appreciated that the information could also be displayed as text, a table, an interactive element, or in any other form. This presentation is beneficial, for example, as it allows a user to compare the estimated performance of their portfolio prior to optimization by the financial platform 140, against the estimated performance of their portfolio after optimization by the financial platform 140.

As described herein, the financial platform 140 can determine one or more transactions that can be executed to optimize (or otherwise modify) the composition of the user's financial portfolio. FIG. 4F shows an example GUI 450 that presents information regarding the user's current portfolio composition, and an optimized or target portfolio composition. This allows the user to quickly compare the current state of their portfolio against the optimized or target state of the portfolio, and ascertain the differences between them. The user can elect to execute all or some of the transactions that would bring the portfolio from its current state to its optimized (or otherwise modified) state.

As described herein, the financial platform 140 can display information to users using notifications or "feeds." FIG. 4G shows an example GUI 460 that presents information in the form of a list 462 (e.g., a chronological "feed" of information). Each item on the list 462 includes a textual message 464 (e.g., describing a particular event that occurred, or describing a particular condition of the user's financial portfolio), and an image 466. A user can select one or more of the items to obtain additional information regarding the selected event or condition.

As described herein, the financial platform 140 can enable users to enter statements or "thoughts" regarding an asset, and vote on the statements or thoughts of others. FIG. 4H shows an example GUI 470 that presents voteable statements to users. The GUI 470 includes a prediction portion 472 presenting information regarding a user's prediction. The GUI 470 also includes a list 474 displaying voteable statements regarding the prediction (e.g., an opinion regarding the performance of a corporate executive, an opinion regarding the value of the asset, an opinion regarding a product of the company, and so forth). Users can vote in support of or against each statement (e.g., by selecting an appropriate command, such as "like," "dislike," "thumbs up," "thumbs down," etc.). Further, the list 474 can be sorted, such that popular statements (e.g., statements having higher net vote totals) are more prominent than less popular statements (e.g., statements having lower net vote totals).

Further, the GUI 470 enables users to solicit additional information from the user who made the prediction (e.g., by selecting an "Ask Why" command 476). The user who made the prediction can enter a statement in response, and the response can be presented on the list 474 for voting.

Further, the GUI 470 enables a user to pose questions to the user who made the prediction (e.g., by entering a statement in a dialog 478, indicating whether the statement is a positive sentiment or a negative sentiment, and submitting the statement for consideration, such that the user who made the prediction can vote on it, and the user who posed the question can view the result of that vote).

As described herein, a user can input information regarding each prediction individually. For example, a user can input a predicted return with respect to a first asset, and input a different predicted return with respect to a second asset. However, in some cases, the user can enter information that is common to multiple different predictions. As an example, a user can input a single average predicted return with respect to their entire portfolio. This single value can be applied to all of the user's subsequent predictions with respect to that portfolio as the default predicted return. Price targets for predictions can be determined by this default return, or can be further edited by the user. This can be beneficial, for example, as the user does not need to repeatedly enter the same predicted return across multiple predictions, or manually calculate price targets. Thus, a user can input predictions more quickly.

Figure 4I:

FIG. 4I shows an example GUI 480 for entering common information across multiple different predictions. In this example, the user can input a predicted yield across their entire portfolio (e.g., by entering the predicted yield into the input box 482). The entered predicted yield is propagated across each of the user's predictions with respect to that portfolio, such that the user need not manually input the information for each individual prediction.

Although example GUIs are depicted and described herein, these are merely illustrative example. In practice, a financial platform 140 can provide different GUIs to perform each of the functions described herein, either in addition to or instead of those depicted.

Figure 5:
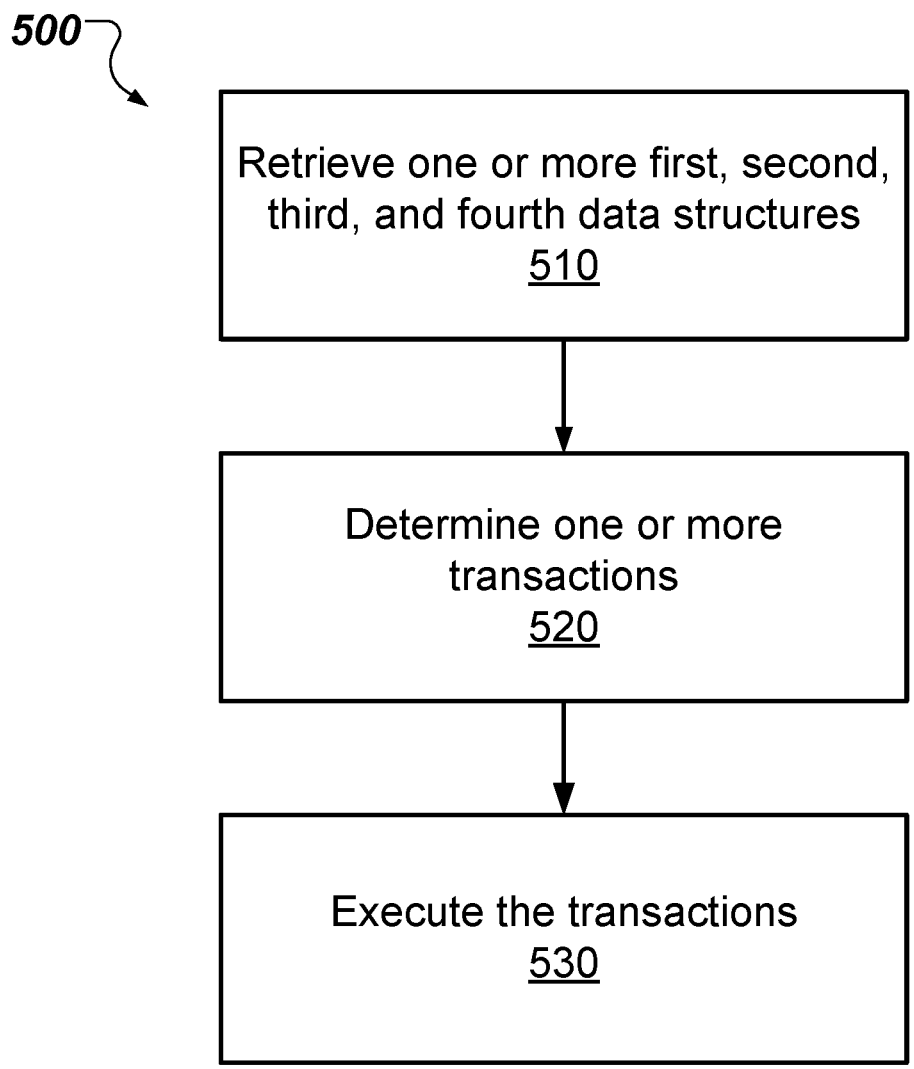
FIG. 5 depicts an example process that can be executed in accordance with implementations of the present disclosure.

FIG. 5 shows an example process 500 for determining one or more transactions that can be can executed with respect to a financial portfolio. As described herein, these transactions can be modelled transactions, simulated transactions, transactions that are automatically executed on behalf of the user, or other transactions that optimize, improve, or otherwise modify the user's portfolio. The process 500 can be performed, for example, by the processing module 230 of the financial platform 140.

Several data structures are retrieved by at least one processor (510). The data structures can include one or more first data structures pertaining to a current state of a financial portfolio of a first user. The data structures can also include one or more second data structures pertaining to one or more historical and/or current states of a financial market. The data structures can also include one or more third data structures pertaining to one or more predictions regarding one or more financial assets of the financial market. The data structures can also include one or more fourth data structures pertaining to the first user's preferences with respect to the financial portfolio.

As described herein, example data structures include, for example, SQL data structures, XML data structures, Postgres data structures, and spreadsheets. Such structures can include, for example, sequences or arrangements of data items such as integers, long integers, floating-point numbers, double-precision numbers, Booleans, characters, strings, timestamps, and so forth. Data structures can be linked, not linked, nested, combined, encrypted, compressed, or otherwise manipulated or arranged for the purposes of storing, accessing, modifying, and deleting information in a database module (e.g., the database module 210).

The processor determines one or more transactions to be conducted on the financial market based on the one or more first data structures, the one or more second data structures, the one or more third data structures, and the one or more fourth data structures (520).

As described herein, in some implementations, these transactions, when executed, can optimize, improve, or otherwise modify the user's portfolio in accordance with their predictions, the predictions of others, their preferences, and/or their objectives. These transactions can be determined in different ways. For example, as described herein, an optimal or target position can be computationally determined using an optimization model, such as a Markowitz mean variance (MMV) model or modified MMV model. These models can be used, for instance, to maximize a portfolio's expected return based on particular parameters, such as a predicted future state of an asset, a given amount of portfolio risk, restrictions on the types of transactions that can be performed, a range of allowable asset allocations, and other such inputs. In some implementations, these parameters can be determined based on the user's selected predictions.

The processor executes the one or more transactions (530). In some examples, the transactions can be executed on a financial market automatically or in response to a user command. This can be beneficial, for example, as it enables a user to quickly and efficiently modify their financial portfolio. In some examples, the transactions are not executed in a real-world financial market, and are instead executed in a simulated environment, and their performance is simulated over a period of time (e.g., as if they actually had been executed in a real-world financial market). This can be beneficial, for example, as it enables users to evaluate the performance of the computerized financial trading system over a period of time without conducting actual transactions in a real-world financial market. This also can be beneficial, for example, as it enables users to view modelled or simulated transactions in a low-risk environment.

In some implementations, the process 500 can also include retrieving the one or more predictions from one or more second users different than the first user. As described herein, a prediction can include an identity of a second user (e.g., another user of a financial transaction system), an indication of a particular financial asset of the financial market (e.g., a stock, a bond, a commodity, or other asset), and an indication of a predicted future price or return of that financial asset. In some implementations, the prediction can also include an indication of the second user's confidence regarding the at least one prediction.

In some implementations, the one or more third data structures can include various data fields. For example, as described herein, the third data structures can each include a data field containing an identity of the second user, a data field containing an indication of the particular financial asset of the financial market, and a data field containing an indication of a predicted future price or return of that financial asset.

In some implementations, the first user's preferences can include various parameters. For example, as described herein, these parameters can include a risk tolerance of the first user with respect to the financial portfolio, a leverage threshold with respect to the financial portfolio, a volatility tolerance of the first user with respect to the financial portfolio, a cash reserve threshold with respect to the financial portfolio, one or more asset allocation criteria with respect to the financial portfolio, and/or a combination thereof.

The one or more transactions to be conducted on the financial market can be determined in various ways. For example, in some implementations, this can be performed by determining a target state of the financial portfolio based on the first, second, third, and fourth data structures, and determining a difference between the target state of the financial portfolio and the current state of the financial portfolio. Based on this information, the one or more transactions to be conducted on the financial market to align the current state of the financial portfolio to the target state of the financial portfolio can be determined.

In some implementations, the one or more transactions can be executed in response to receiving an indication to execute the one or more transactions from the first user. The one or more transactions can be executed substantially simultaneously and/or automatically. In some implementations, the transactions can be executed in a simulated environment (e.g., as if they actually had been executed in a real-world financial market).

In some implementations, the one or more predictions can be retrieved from the first user, and one or more fifth data structures can be generated based on the one or more predictions from the first user. The one or more fifth data structures can be transmitted to one or more second users, such that the predictions are shared with others.

In some implementations, one or more notifications can be generated based on at least one of the data structures (e.g., one or more of the first, second, third, fourth, and/or fifth data structures), and the one or more notifications can be displayed to the user (e.g., alone, sequentially, or concurrently, such as in a "feed"). In some implementations, a notification can be generated based on a third data structure that had been retrieved from a second user (e.g., corresponding to a prediction shared by the second user with the first user).

In some implementations, notifications can be generated based on the financial portfolios of one or more users, and displayed to another user for review. For instance, one or more sixth data structures can be retrieved, where the sixth data structures pertain to a financial portfolio of the second user. One or more notifications can be determined based on the sixth data structures and presented to the first user for review. As above, notifications can be displayed to the user alone, sequentially, or concurrently, such as in a "feed."

In some implementations, notifications can be generated based on the associations between users, and displayed to another user for review. For instance, one or more seventh data structures can be retrieved, where the seventh data structures pertain to an association between two or more users of a social media platform (e.g., a "connection," "friendship," "link," or other association between two or more users on a social media platform, such as the social media platform 160, or third-party social network). One or more notifications can be determined based on the seventh data structures and presented to the first user for review. As above, notifications can be displayed to the user alone, sequentially, or concurrently, such as in a "feed."

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the computing systems 110a-c, the client computing system 120a-c, and the modules 140, 150, 160, 210, 220, and 230 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the invention. Accordingly, other embodiments are within the scope of the following claims.

What is claimed is:

1. A computer-implemented method comprising:
   storing and retrieving, by at least one processor:
      one or more first data structures pertaining to a current state of a financial portfolio of a first user;
      one or more second data structures pertaining to one or more historical states and current states of a financial market;
      one or more third data structures pertaining to one or more predictions regarding one or more financial assets of the financial market; and
      one or more fourth data structures pertaining to the first user's preferences with respect to the financial portfolio;
   storing and retrieving, by the at least one processor, a plurality of fifth data structures, each fifth data structure indicating a respective second prediction regarding one or more financial assets of the financial market from a plurality of second users different from the first user,
      wherein the second users are determined by determining a similarity between each of the second users and the first user, and
      wherein determining the similarity between each of the second users and the first user comprises:
         determining a similarity between the first user's preferences regarding management of the financial portfolio and each of the second users' preferences regarding management of their respective financial portfolios, and
         determining a similarity between a composition of the financial portfolio of the first user and a composition of the financial portfolios of each of the second users;
   displaying, by the at least one processor using a display device, at least two of the second predictions concurrently to the first user on a graphical user interface rendered on the display device;

receiving, by the at least one processor via the graphical user interface, a user input indicating that the user has activated a subset of the displayed second predictions;

updating, by the at least one processor, the graphical user interface to indicate, concurrently:
the activated subset of the displayed second predictions,
one or more first user interface elements enabling the first user to inactivate one or more of the second predictions of the activated subset of the second predictions,
an inactivated subset of the displayed second predictions, and
one or more second user interface elements enabling the first user to activate one or more of the second predictions of the inactivated subset of the second predictions;

determining, by the at least one processor, one or more transactions to be conducted on the financial market based on the one or more first data structures, the one or more second data structures, the one or more third data structures, the one or more fourth data structures, and the activated subset of the displayed second predictions; and executing, by the at least one processor, the one or more transactions, wherein the one or more first data structures, the one or more second data structures, the one or more third data structures, the one or more fourth data structures, and the one or more fifth data structures are stored and retrieved using a computer network, and wherein an amount of data that is transmitted across the computer network by storing and retrieving of the one or more first data structures, the one or more second data structures, the one or more third data structures, the one or more fourth data structures, and the one or more fifth data structures is reduced, relative to an amount of data that is transmitted across the computer network by storing and retrieving unstructured data indicating:
the current state of the financial portfolio of the first user,
the one or more historical states and current states of a financial market,
the one or more predictions regarding one or more financial assets of the financial market,
the first user's preferences with respect to the financial portfolio, and
the one or more second prediction of the one or more second users.

2. The method of claim 1, wherein each of the fifth data structures comprises:
an identity of a particular second user;
an indication of a particular financial asset of the financial market; and
an indication of a predicted future price or return of that financial asset.

3. The method of claim 2, wherein each of the fifth data structures further comprises an indication of the particular second user's confidence regarding the at least one prediction.

4. The method of claim 1, wherein each of the fifth data structures comprises:
a data field containing an identity of the particular second user;
a data field containing an indication of the particular financial asset of the financial market; and
a data field containing an indication of a predicted future price or return of that financial asset.

5. The method of claim 1, wherein the first user's preferences correspond to at least one of:
a risk tolerance of the first user with respect to the financial portfolio;
a leverage threshold with respect to the financial portfolio;
a volatility tolerance of the first user with respect to the financial portfolio;
a cash reserve threshold with respect to the financial portfolio; and
one or more asset allocation criteria with respect to the financial portfolio.

6. The method of claim 1, wherein determining the one or more transactions to be conducted on the financial market comprises:
determining, by the one or more processors, a target state of the financial portfolio based on the one or more first data structures, the one or more second data structures, the one or more third data structures, the one or more fourth data structures, and the activated subset of the displayed second predictions;
determining, by the one or more processors, a difference between the target state of the financial portfolio and the current state of the financial portfolio; and
determining, by the one or more processors, the one or more transactions to be conducted on the financial market to align the current state of the financial portfolio to the target state of the financial portfolio.

7. The method of claim 1, wherein the one or more transactions are executed in response to receiving an indication to execute the one or more transactions from the first user.

8. The method of claim 7, wherein the one or more transactions are executed substantially simultaneously.

9. The method of claim 1, wherein the one or more transactions are executed automatically.

10. The method of claim 1, further comprising:
retrieving the one or more predictions from the first user;
generating one or more sixth data structures based on the one or more predictions from the first user; and
transmitting the one or more sixth data structures to one or more of the second users.

11. The method of claim 10, further comprising:
generating, by the at least one processor, a notification based on at least one of the one or more first data structures, the one or more second data structures, the one or more third data structures, the one or more fourth data structures, and the one or more sixth data structures; and
displaying the notification to the first user.

12. The method of claim 11, wherein the notification is generated based on the data structures.

13. The method of claim 10, further comprising:
retrieving, by the at least one processor, one or more seventh data structures pertaining to a financial portfolio of one of the second users;
generating, by the at least one processor, a notification based on the one or more seventh data structures; and
displaying the notification to the first user.

14. The method of claim 13, further comprising:
retrieving, by the at least one processor, one or more eighth data structures pertaining to an association between two or more users of a social media platform;

generating, by the at least one processor, a second notification based on the one or more eighth data structures; and displaying the second notification to the first user.

15. The method of claim 10, further comprising:

generating, by the at least one processor, a plurality of notifications based on at least one of the one or more first data structures, the one or more second data structures, the one or more third data structures, the one or more fourth data structures, and the one or more sixth data structures; and displaying the notifications to the first user, wherein at least some of the notifications are displayed concurrently in a feed.

16. The method of claim 14, wherein at least one of the notifications is generated based on the fifth data structures retrieved from the one of the second users.

17. The method of claim 10, further comprising:

retrieving, by the at least one processor, one or more seventh data structures pertaining to a financial portfolio of one of the second users;

generating, by the at least one processor, a plurality of notifications based on the one or more seventh data structures; and displaying the notification to the first user.

18. The method of claim 17 further comprising:

retrieving, by the at least one processor, one or more eighth data structures pertaining to an association between two or more users of a social media platform;

generating, by the at least one processor, a second plurality of notifications based on the one or more eighth data structures; and displaying the second plurality of notification to the first user.

19. The method of claim 1, further comprising:

retrieving, by the at least one processor, one or more ninth data structures comprising one or more statements received from the first user regarding a particular financial asset or a particular prediction regarding a financial asset;

presenting, by the at least one processor, the one or more statements to one or more of the second users;

receiving, by the at least one processor, one or more votes regarding the one or more statements from the one or more of the second users; and presenting, by the at least one processor, the one or more statements and indications of the one or more votes to the first user and the one or more one of the second users.

20. The method of claim 19, wherein presenting the one or more statements and the indications of the one or more votes comprises:

presenting the one or more statements and the indications of the one or more votes in a list, wherein the list is sorted based on the one or more votes.

21. The method of claim 20, wherein presenting the one or more statements and the indications of the one or more votes further comprises:

filtering the list based on the one or more votes.

22. The method of claim 1, wherein executing the one or more transactions comprises executing the one or more transactions in a simulated environment.

23. The method of claim 1, wherein determining the similarity between the first user's preferences regarding management of the financial portfolio and the second users' preferences regarding management of their respective financial portfolios comprises:

determining that the first user has a risk tolerance similar to that of each of the second users.

24. The method of claim 1, wherein determining the similarity between the first user's preferences regarding management of the financial portfolio and the second users' preferences regarding management of their respective financial portfolios comprises:

determining that the first user and each of the second users have specified similar volatility targets with respect to their financial portfolios.

25. The method of claim 1, wherein determining the similarity between the first user's preferences regarding management of the financial portfolio and the second users' preferences regarding management of their respective financial portfolios comprises:

determining that the first user and each of the second users permit a similar type of transaction to be performed with respect to their financial portfolios.

26. The method of claim 1, wherein determining the similarity between the first user's preferences regarding management of the financial portfolio and the second users' preferences regarding management of their respective financial portfolios comprises:

determining that the first user and each of the second users have specified at least one of a similar minimum annual dividend income, a similar single-position concentration limit, a similar cash reserve minimum, a similar range for beta constraints, or a similar range for allocation per asset with respect to their financial portfolios.

27. The method of claim 1, wherein determining the similarity between the first user's preferences regarding management of the financial portfolio and the second users' preferences regarding management of their respective financial portfolios comprises:

determining that the first user and each of the second users have similar trading patterns with respect to their financial portfolios.

* * * * *